(12) United States Patent
Murade et al.

(10) Patent No.: US 6,859,247 B2
(45) Date of Patent: Feb. 22, 2005

(54) ELECTRO-OPTICAL APPARATUS AND PROJECTION-TYPE DISPLAY APPARATUS

(75) Inventors: Masao Murade, Suwa (JP); Masahide Uchida, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 09/956,031

(22) Filed: Sep. 20, 2001

(65) Prior Publication Data

US 2002/0060832 A1 May 23, 2002

(30) Foreign Application Priority Data

Sep. 29, 2000 (JP) ........................................ 2000-300929
Sep. 12, 2001 (JP) ........................................ 2001-277092

(51) Int. Cl.[7] .......................................... G02F 1/1343
(52) U.S. Cl. ...................................................... 349/139
(58) Field of Search ........................................ 349/139

(56) References Cited

U.S. PATENT DOCUMENTS

| 5,200,847 | A | * | 4/1993 | Mawatari et al. ............ 349/151 |
| 5,814,935 | A | * | 9/1998 | Ujihara ........................ 313/504 |
| 6,108,057 | A | * | 8/2000 | Kusanagi ...................... 349/40 |
| 6,172,721 | B1 | * | 1/2001 | Murade et al. ................ 349/43 |
| 6,249,327 | B1 | * | 6/2001 | Murade et al. ................ 349/43 |
| 6,614,053 | B1 | * | 9/2003 | Takenaka ...................... 257/66 |

FOREIGN PATENT DOCUMENTS

| JP | 2-150823 A | 6/1990 |
| JP | 2-223927 A | 9/1990 |
| JP | A 06-258659 | 9/1994 |
| JP | 06-289413 | 10/1994 |
| JP | 8-184857 A | 7/1996 |
| JP | 10-239710 A | 9/1998 |
| JP | 11-052328 | 2/1999 |
| JP | 11-101985 | 4/1999 |

* cited by examiner

Primary Examiner—Howard Weiss
(74) Attorney, Agent, or Firm—Oliff & Berridge, PLC

(57) ABSTRACT

In an electro-optical apparatus, such as a liquid-crystal apparatus, a TFT array substrate is provided with pixel electrodes and TFTs connected thereto. In addition, a peripheral area (including a frame area and a sealing area) is provided with peripheral circuits that drive the pixel electrodes, such as data-line driving circuits and a sampling circuit, and wires that send image signals. On an opposite substrate, an opposite electrode is formed so as to avoid areas opposite the wires. Therefore, with a relatively simple structure, parasitic capacitors generated between the wires on one substrate and the opposite electrode on the other substrate are reduced, and high-quality image display having a reduced ghost is achieved.

17 Claims, 12 Drawing Sheets

(FIG. 1)
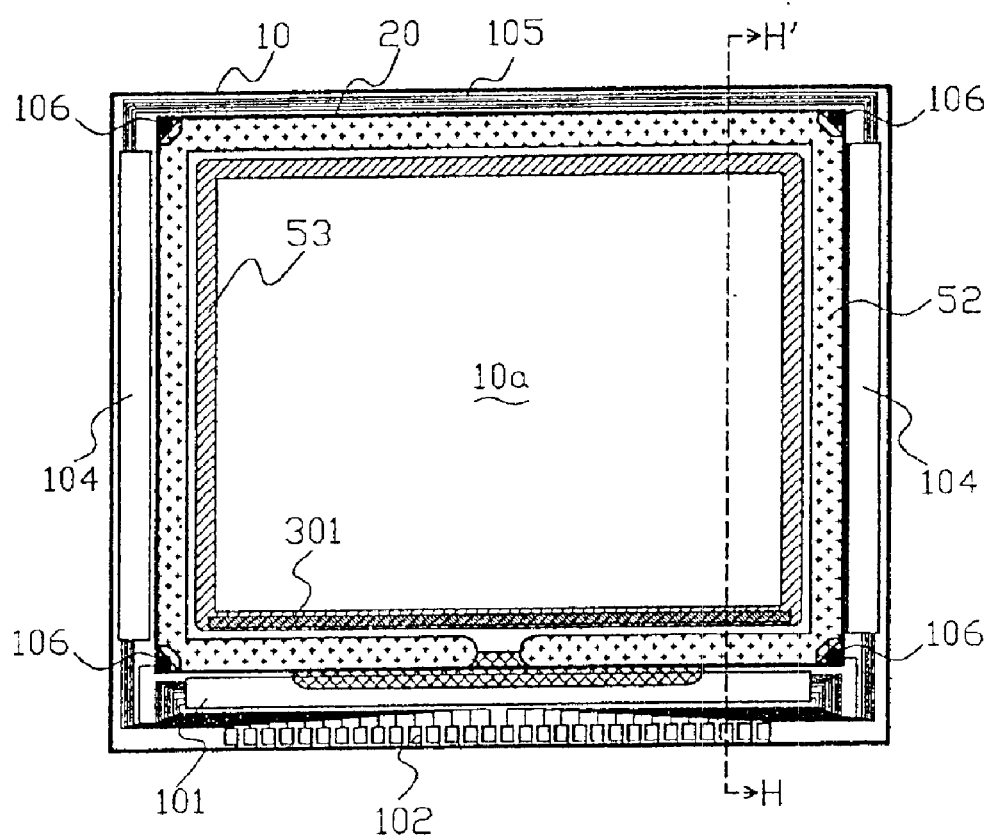
(FIG. 2)
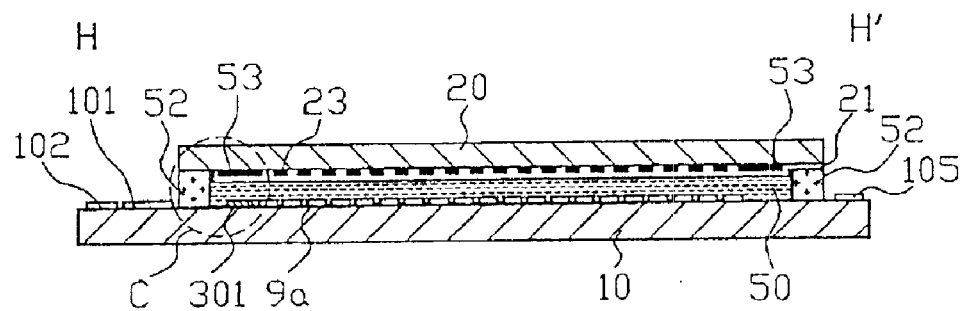

(FIG. 3)
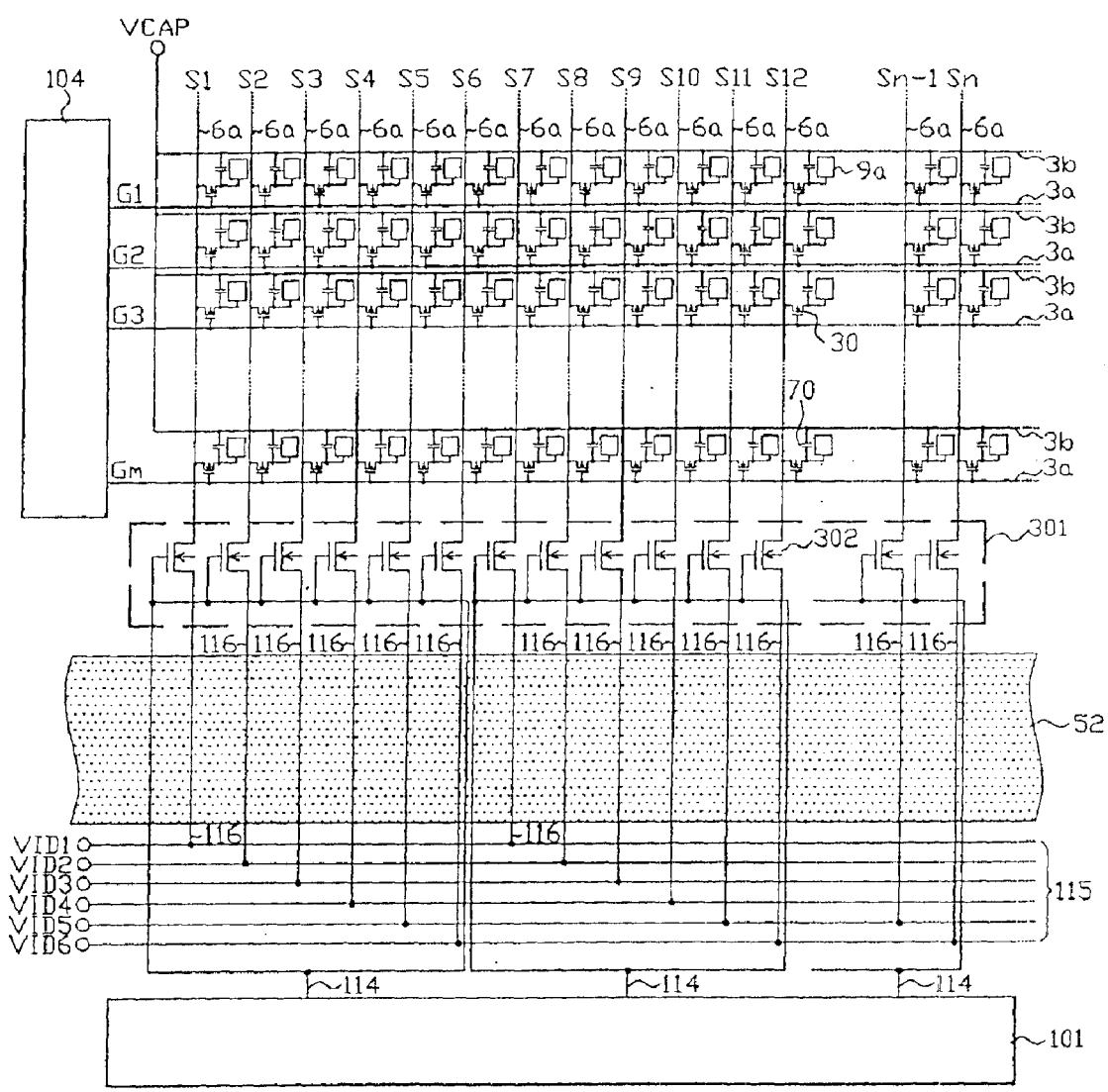

(FIG. 4)
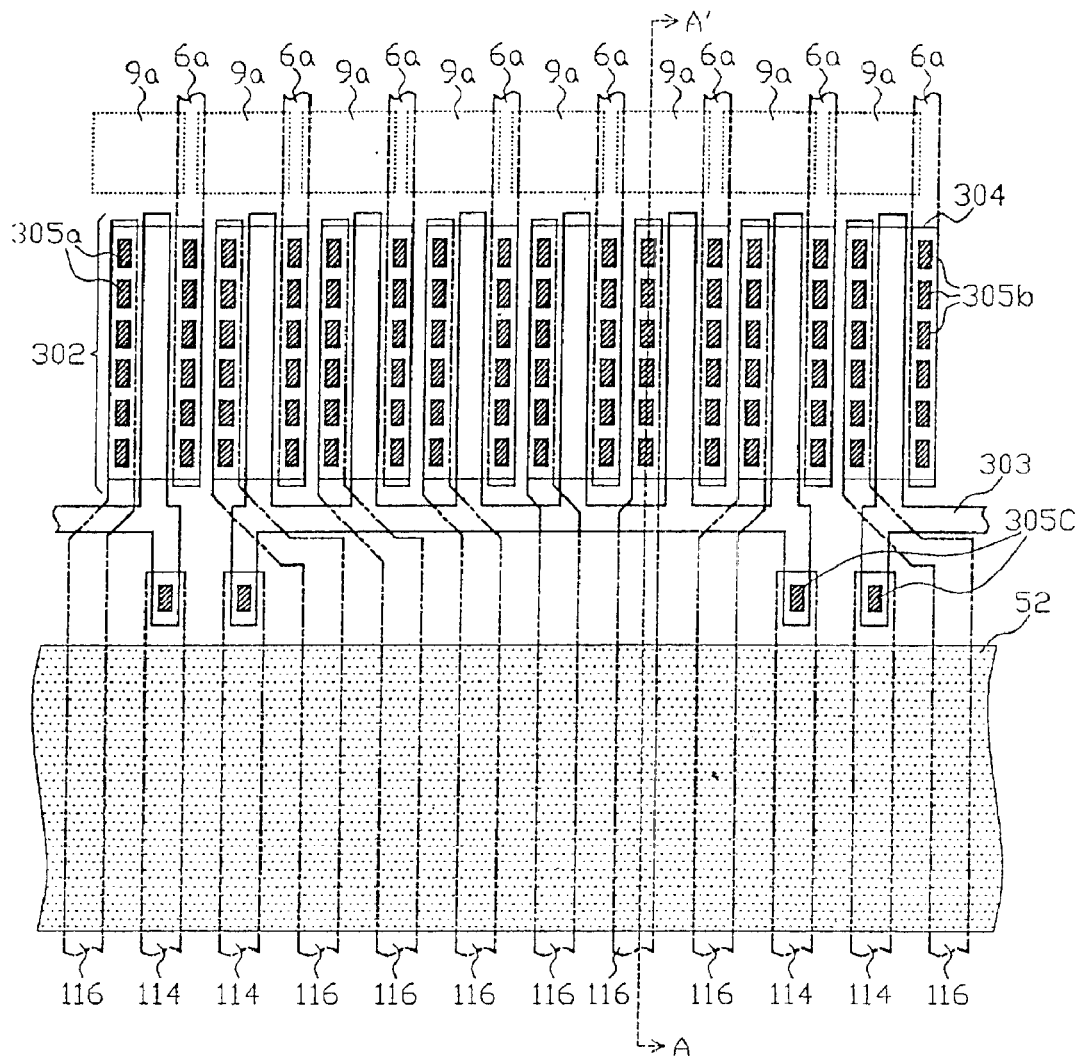
(FIG. 5)
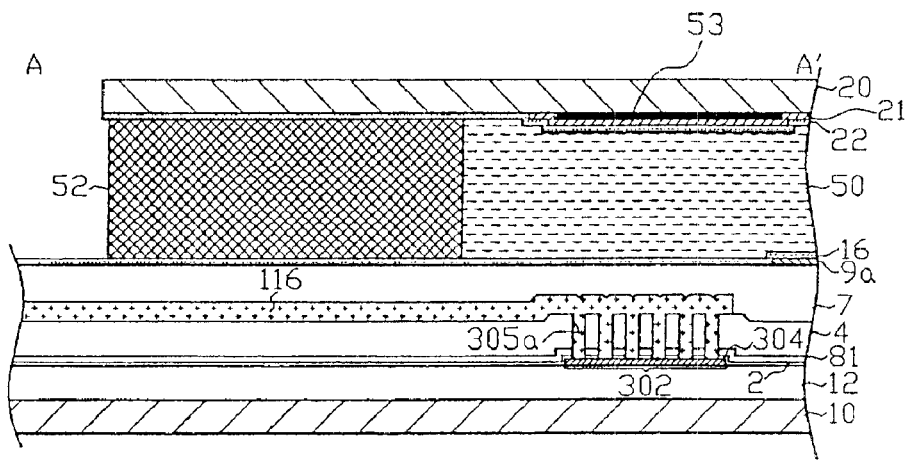

(FIG. 6)
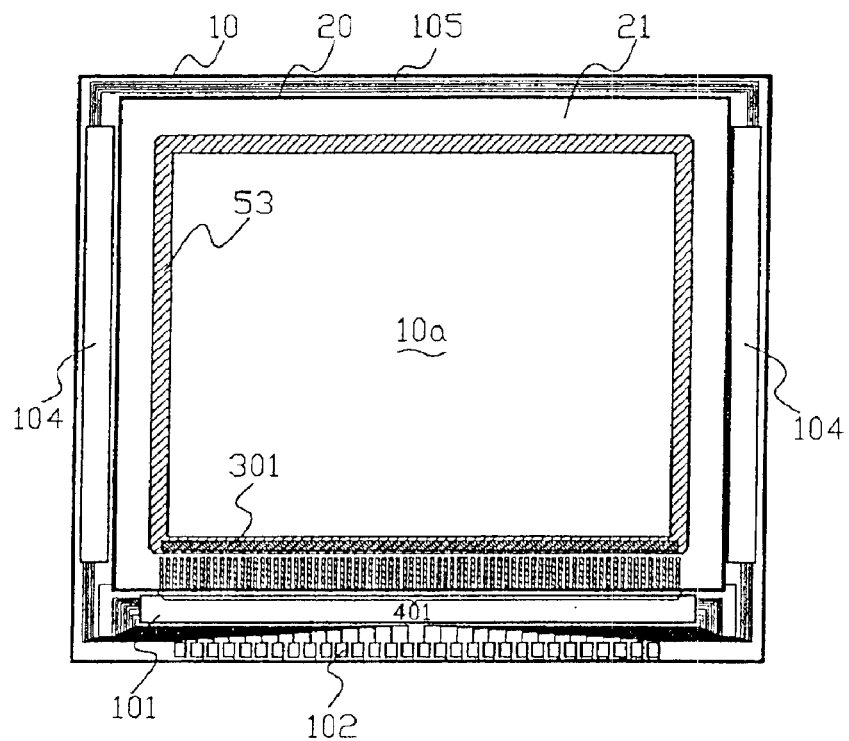
(FIG. 7)
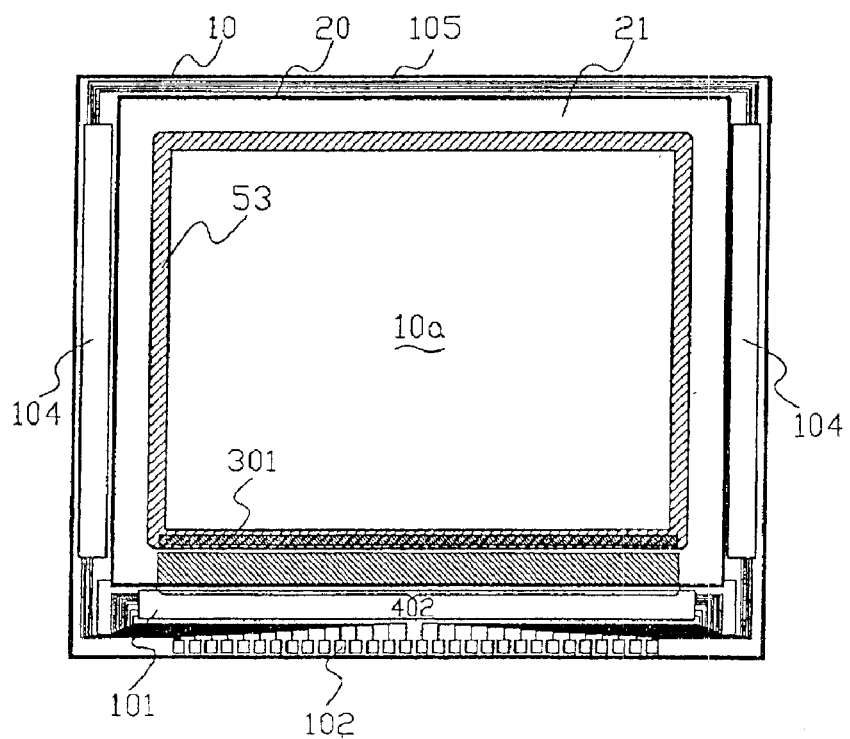

(FIG. 8)
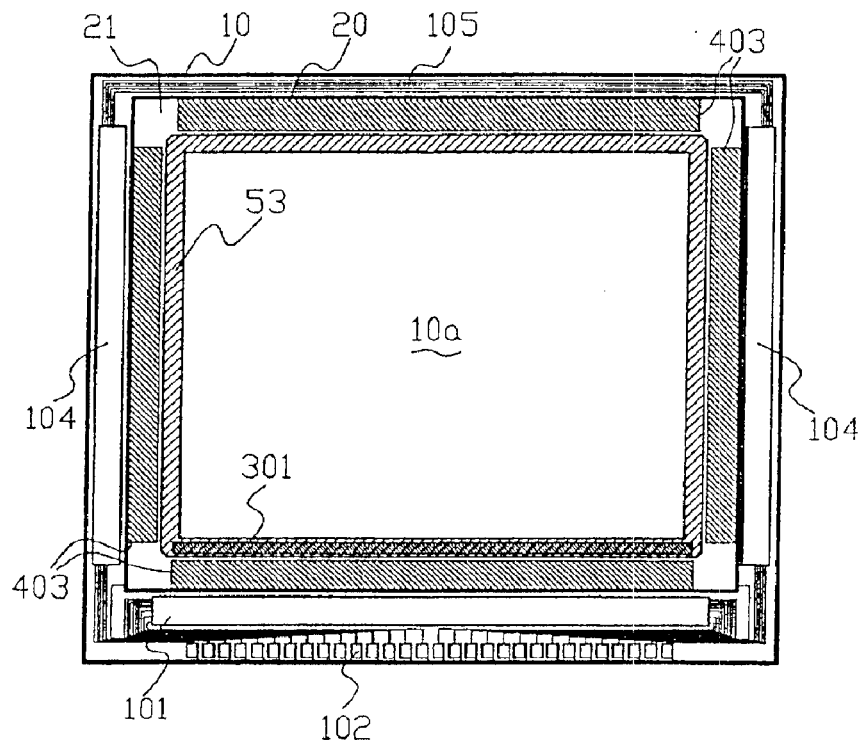
(FIG. 9)
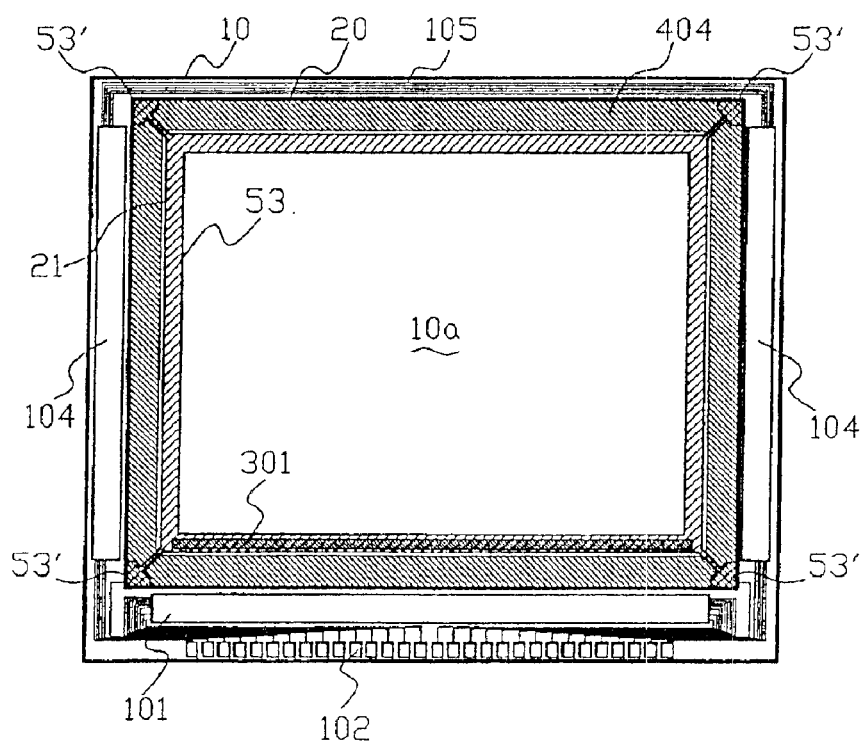

(FIG. 10)
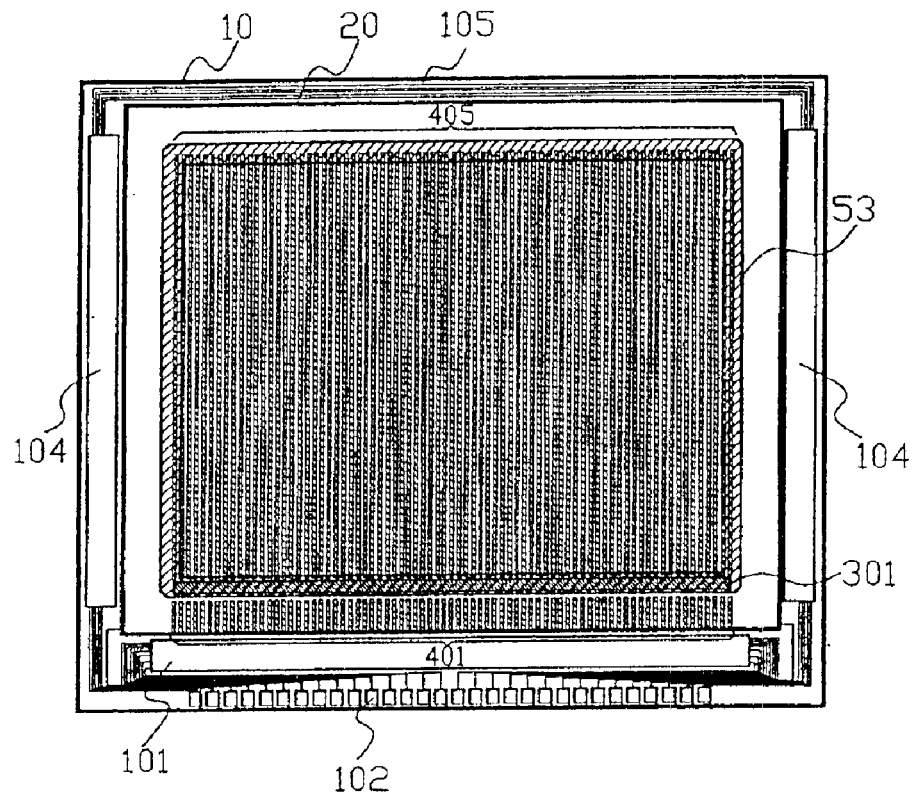
(FIG. 11)
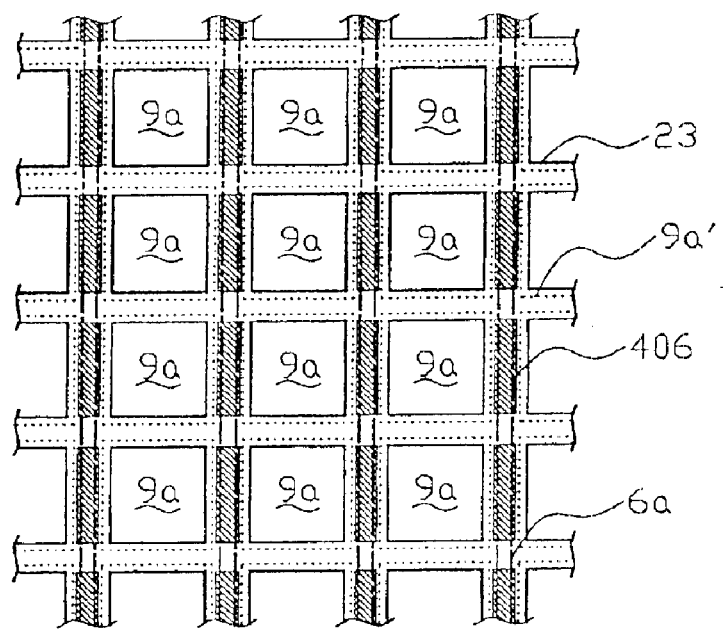

(FIG. 12)
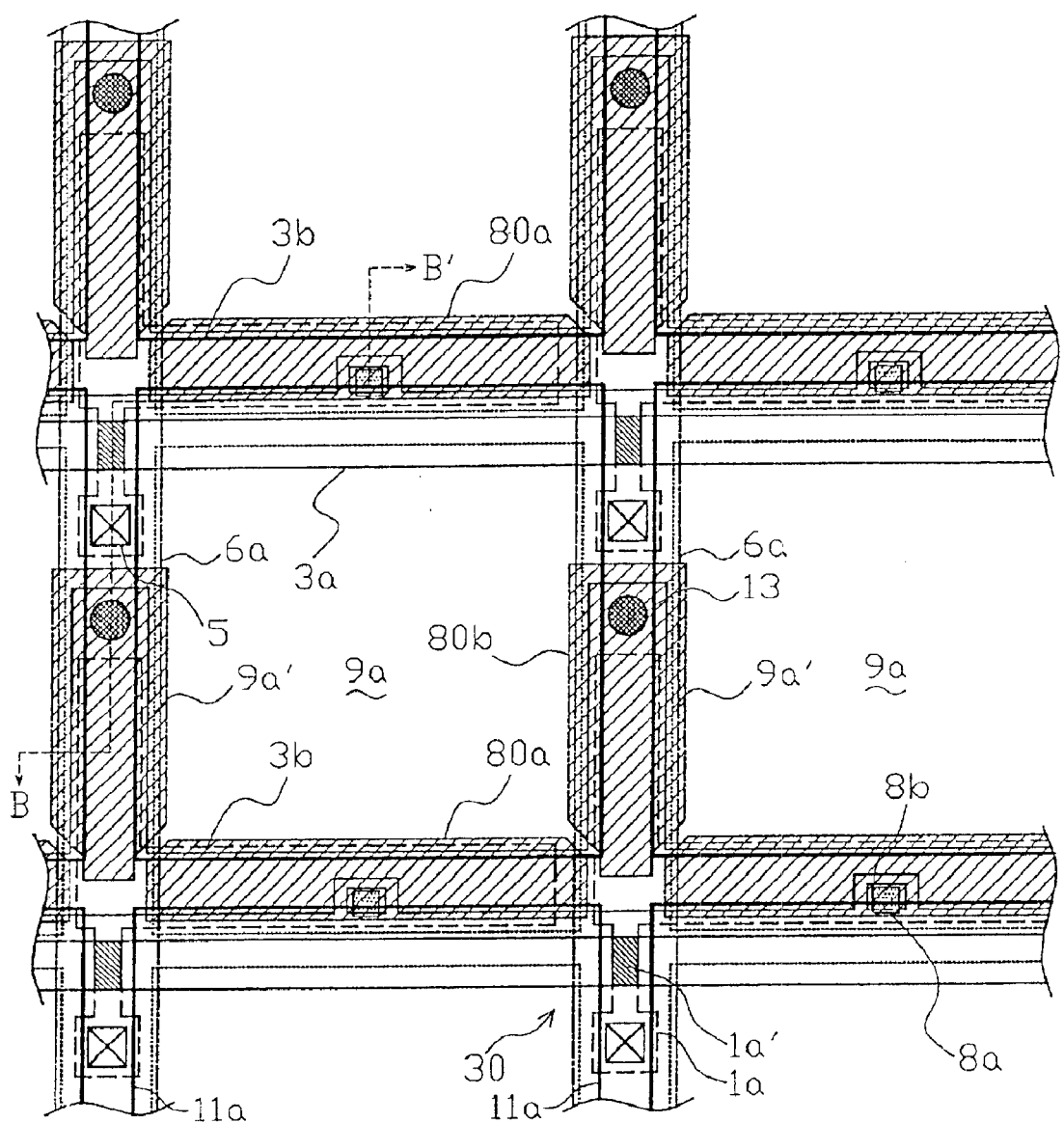

(FIG. 13)
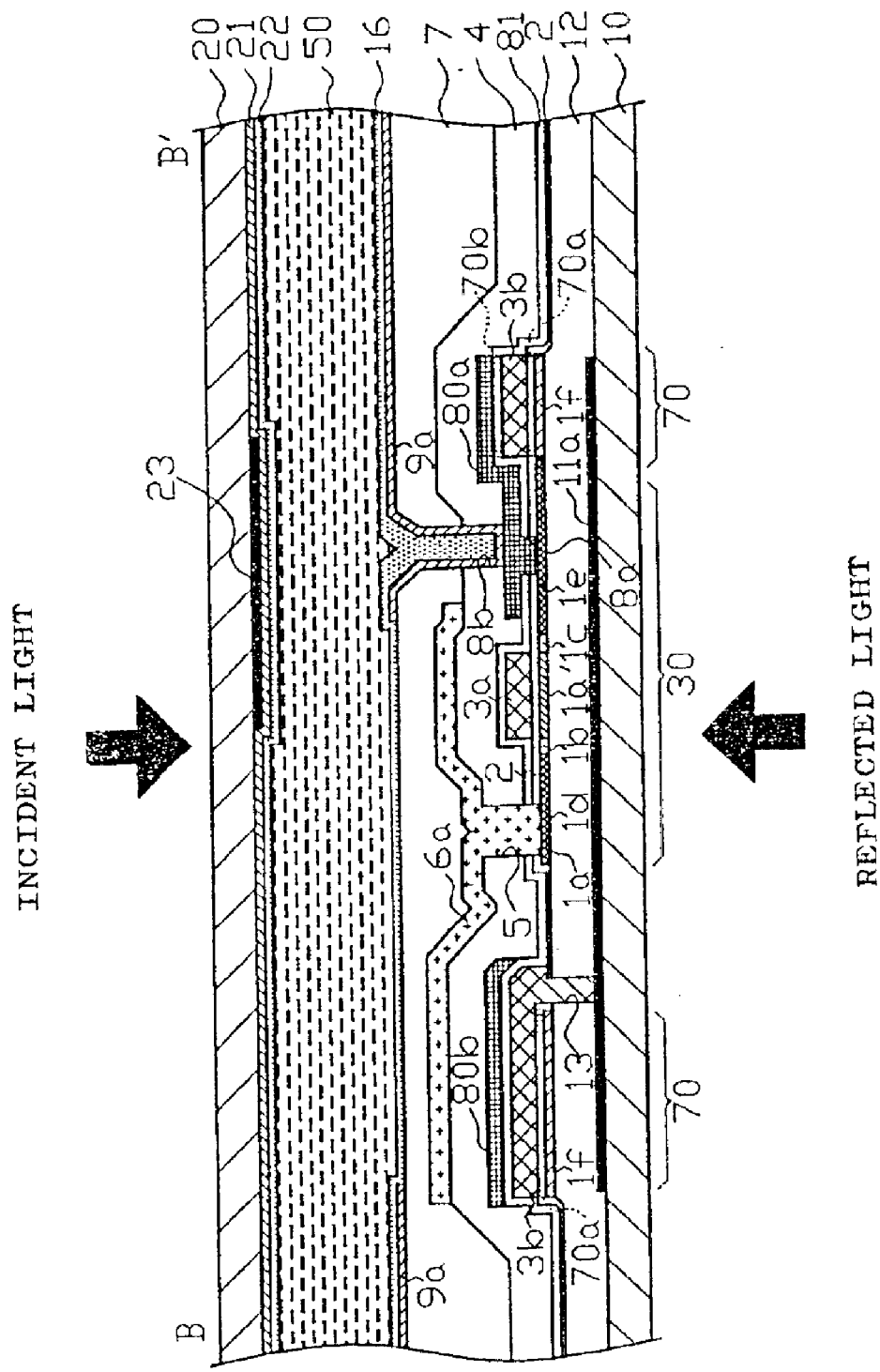

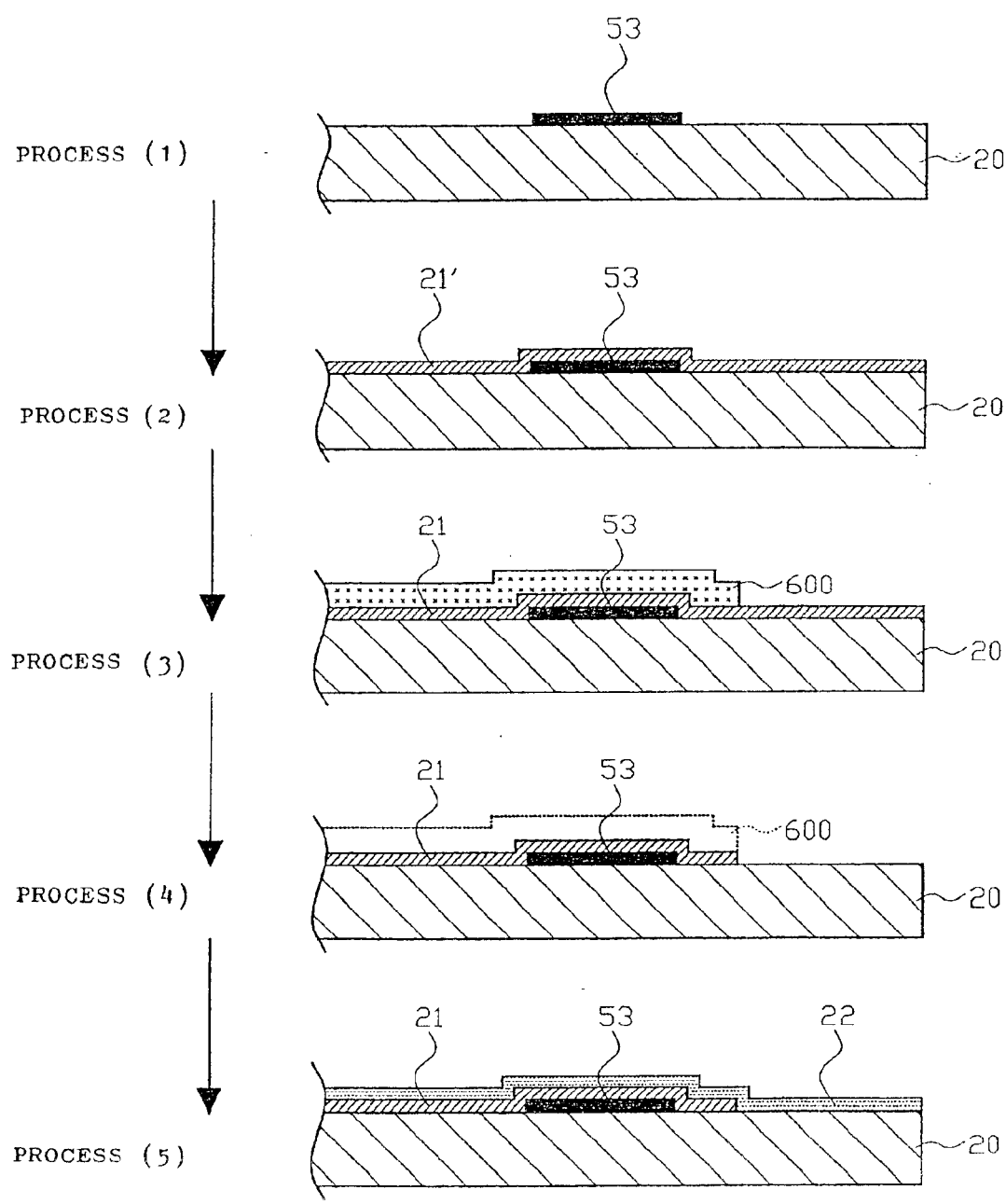

(FIG. 15)
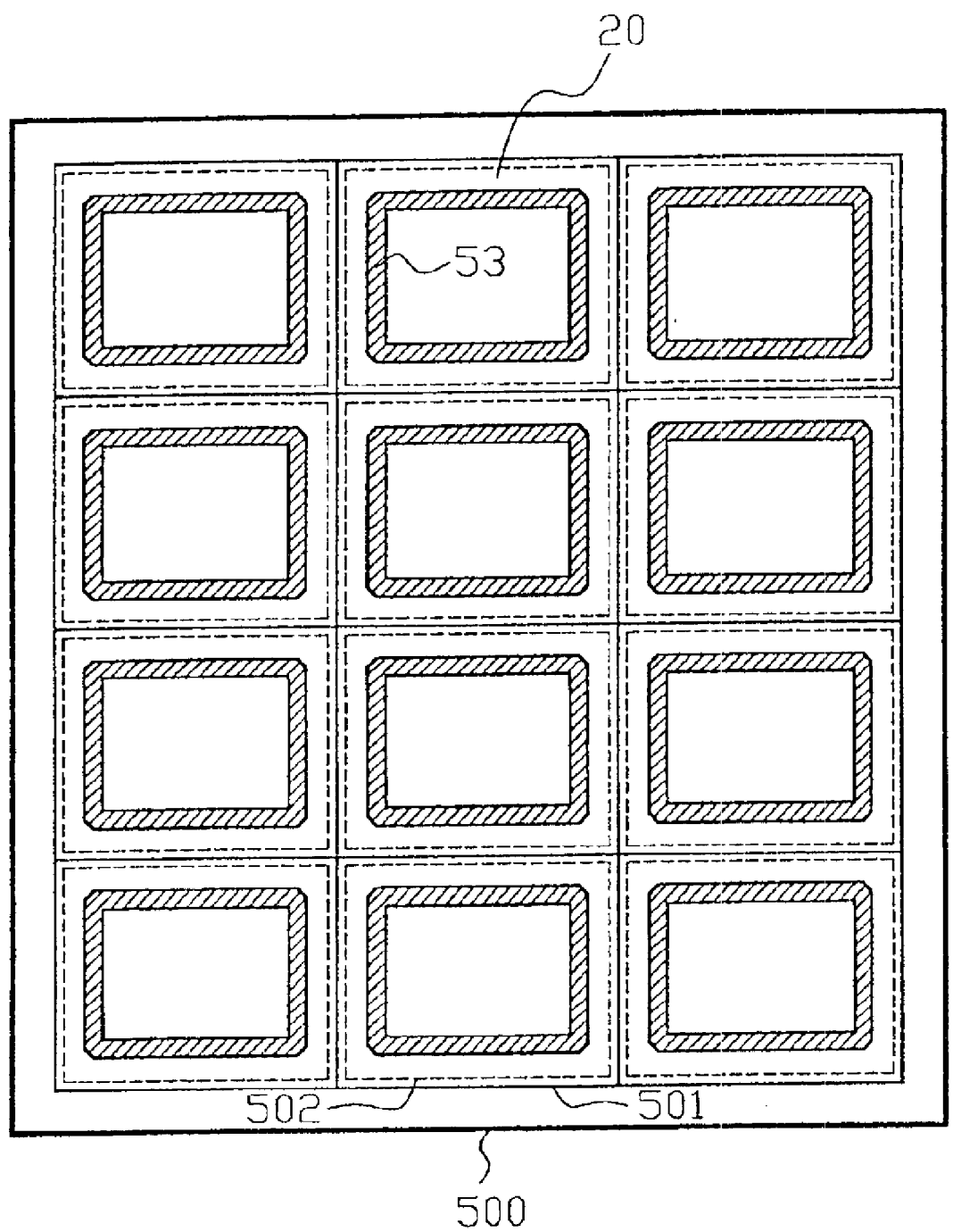

PRIOR ART
(FIG. 16)
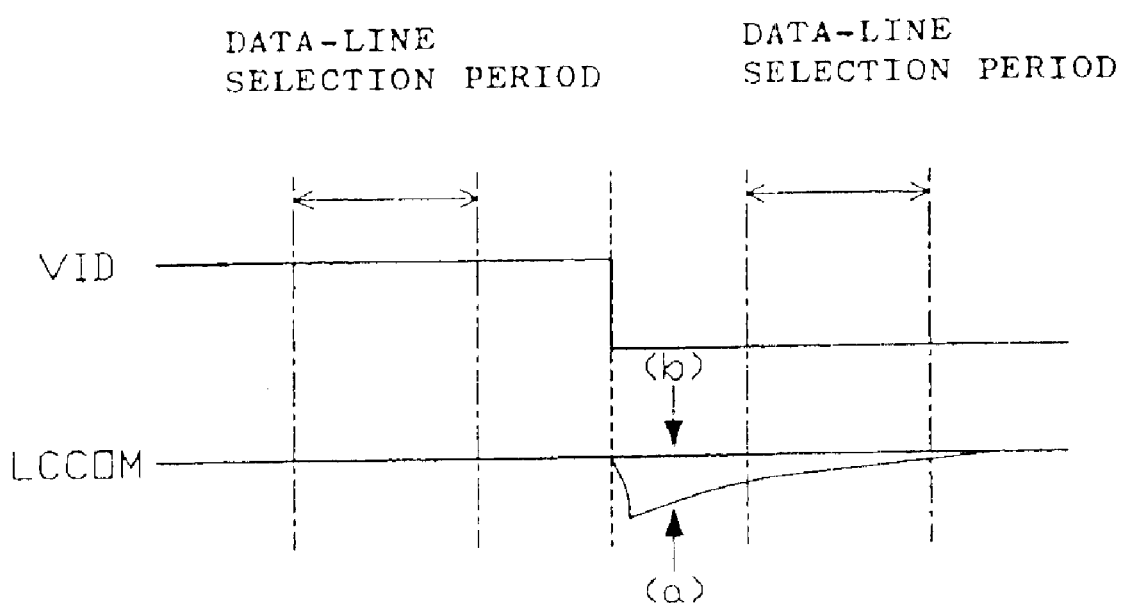

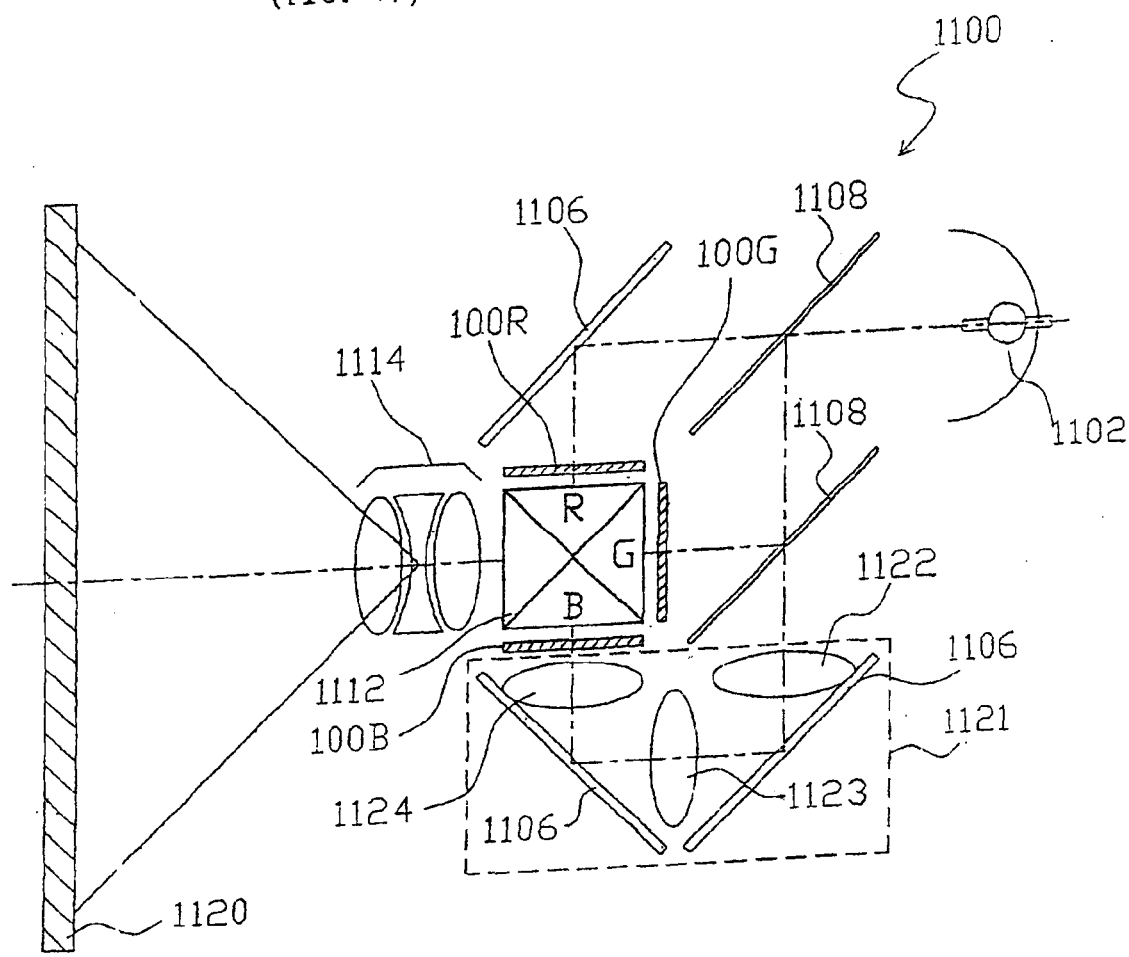
(FIG. 17)

ELECTRO-OPTICAL APPARATUS AND PROJECTION-TYPE DISPLAY APPARATUS

BACKGROUND OF THE INVENTION

1. Field of the Invention

The present invention belongs to the technical fields of electro-optical apparatuses, such as a liquid-crystal apparatus, in which an electro-optic material is sandwiched by a pair of substrates and a pair of electrodes disposed at sides facing the electro-optic material in the pair of substrates is provided, and of manufacturing methods therefore.

2. Description of the Related Art

This type of electro-optical apparatuses are generally provided with a TFT array substrate having pixel electrodes, thin-film transistors (hereinafter called TFTs (Thin Film Transistors), if necessary) for applying switching control to the pixel electrodes, and wires, such as data lines connected to the thin-film transistors, for sending image signals and scanning lines for sending scanning signals. In addition, an opposite substrate having a color filter, a light-shielding film, and an opposite electrode disposed on the whole surface and disposed opposite the side where the wires are arranged on the TFT array substrate is provided. An electro-optic material, such as liquid crystal, is sandwiched by the TFT array substrate and the opposite substrate. A driving voltage is generated between the pixel electrode corresponding to each pixel and the opposite electrode to drive (for example, to change the alignment state of liquid crystal) each part of the electro-optic material, so that a display operation is performed.

Some of this kind of electro-optical apparatuses are of a driving-circuit built-in type having at a peripheral area outside an image display area various wires, such as image-signal lines for sending image signals to a sampling circuit, and peripheral driving circuits, such as a sampling circuit for sampling the image signals sent through the image-signal lines, according to a sampling-circuit driving signal and for sending through data lines, a data-line driving circuit for sending the sampling-circuit driving signal to the sampling circuit, and a scanning-line driving circuit for sending a scanning signal for TFT switching operations to scanning lines in order to send the image signals sent through the data lines to pixel electrodes.

SUMMARY OF THE INVENTION

When wires on the TFT array substrate, such as the image signal lines and lead wires extended from the image signal lines, and the opposite electrode on the opposite substrate are disposed oppositely as described above, however, parasitic capacitors generated therebetween cause a potential fluctuation of the opposite electrode due to potential fluctuations of image signals. More specifically, as shown in FIG. 16, a potential change of an image signal VID sent through an image signal line fluctuates an opposite-electrode potential LCCOM which should be a constant potential (including a constant potential periodically inverted at inverted driving) as indicated by an arrow "a." Since a potential applied to the electro-optic material is unexpectedly changed at a selection operation of a data line in a subsequent stage before the potential fluctuation of the opposite-electrode potential LCCOM, that is, the potential fluctuation of a common wire, returns to a should-be set voltage, a ghost occurs in a displayed image.

Especially in transmission-type electro-optical apparatuses, since an opposite electrode needs to be made from a transparent electrode, the opposite electrode is generally made from an ITO (Indium Tin Oxide) film. When the opposite electrode is made from a relatively-high-resistance electrically conductive film, such as an ITO film, however, an image signal has been written into pixel electrodes before the opposite electrode has a common potential after a parasitic capacitor generated between the opposite electrode and the image-signal line and others causes potential fluctuation, as described above. Therefore, a ghost conspicuously occurs due to the parasitic capacitor.

Especially in a driving-circuit built-in type, since the magnitude of potential fluctuation is large, or a wire for sending a high-frequency signal and an opposite electrode are disposed oppositely, a large potential fluctuation occurs in the opposite electrode due to the parasitic capacitor. As a result, a ghost occurs more conspicuously.

When a serial image signal is serial-parallel-converted to a plurality of parallel image signals to reduce the frequency, the larger the number of the plurality of parallel image signals is, the more conspicuous a ghost is visually. More specifically, since such a ghost occurs in a screen away from the original image by the same number of data lines as that of serial-parallel conversions, as the number of serial-parallel conversions becomes larger, the ghost spreads in a large block manner and is easier to see. Especially in a case in which data is shown on a personal-computer screen, a block-shaped ghost is visually more conspicuous, although it may be inconspicuous when a motion image is displayed.

To avoid such problems, countermeasures can be considered, such as providing a shielding film for shielding the opposite electrode from the image-signal lines and others, making the opposite electrode from a low-resistance film, and additionally forming a low-resistance film on the opposite electrode. With any countermeasures, it is expected that the cost increases due to a complicated lamination structure of the opposite substrate or complicated manufacturing processes, or the electro-optic material malfunctions due to the additional shielding film.

The present invention has been made in consideration of the foregoing problems. It is an object of the present invention to provide an electro-optical apparatus in which a parasitic capacitor generated between a wire and others disposed on one substrate and an opposite electrode disposed on the other substrate opposite the one substrate is reduced by a relatively simple structure to reduce a potential fluctuation of the opposite electrode due to the parasitic capacitor and thereby, a high-quality image display with a reduced ghost is allowed, and a manufacturing method therefor.

To achieve the foregoing object, an electro-optical apparatus according to the present invention is characterized in that an electro-optic material is sandwiched by a pair of first and second substrates; a plurality of pixel electrodes is provided at an image-display area on the first substrate; wires for sending signals to the pixel electrodes are disposed at the image-display area and a peripheral area located around the image-display area on the first substrate; and an opposite electrode is provided on the second substrate, which is opposite the plurality of pixel electrodes and which is not formed at least at a part of an area opposite at least wire portions located in the peripheral area of the wires.

According to the electro-optical apparatus of the present invention, signals such as image signals are sent through wires formed on the first substrate to the pixel electrodes during operations. Therefore, a driving voltage is applied between the pixel electrode of each pixel and the opposite electrode according to the signal, and an electro-optic material disposed therebetween is driven to perform electro-optical image display. Especially at least at a part of areas opposite wire portions in the peripheral area of the wires such as image signal lines, the opposite electrode is not formed. Therefore, parasitic capacitors generated between the opposite electrode and the wires are reduced by the amount corresponding to the state in which the opposite electrode is partially not opposite the wires, as compared with cases in which the opposite electrode is formed also at portions opposite the wires in the peripheral area, and further, in which the opposite electrode is formed on the entire surface of the second substrate. As a result, according to the present invention, the potential fluctuation of the opposite electrode caused by the potential fluctuations of signals (such as image signals) sent through the wires, generated by parasitic capacitors formed between the wires and the opposite electrode is reduced. Especially, also when the electro-optical apparatus is of a transmission type and the opposite electrode is made from a relatively-high-resistance transparent electrically conductive film, such as an ITO film, since parasitic capacitors generated between the opposite electrode and the wires are reduced, the potential fluctuation of the opposite electrode caused by the parasitic capacitors can be reduced. This is a great advantage. As a result, the potential of the opposite electrode is successfully made to a constant potential (including a constant potential periodically inverted at inverted driving). Consequently, high-quality image display having a reduced ghost is allowed.

The opposite electrode may be partially formed at areas opposite the wire portions in the peripheral area, or may be completely not formed at areas opposite the wire portions in the peripheral area.

In one form of the electro-optical apparatus according to the present invention, the opposite electrode is formed in a strip manner or in a stripe manner so as to avoid areas opposite the wires for each wire in a plane view.

According to this form, the opposite electrode is formed in a strip manner so as to avoid areas opposite the wires disposed on the first substrate for each wire. For example, the opposite electrode is not formed in areas opposite wires disposed in the peripheral area for each wire. Alternatively, the opposite electrode is formed in a stripe manner so as to avoid areas opposite wires disposed on the first substrate for each wire. For example, the opposite electrode is not formed in areas opposite wires disposed in the whole of the peripheral area and the image-display area for each wire. Therefore, the potential fluctuation of the opposite electrode caused by the potential fluctuations of signals sent through the wires, generated by parasitic capacitors formed between the wires and the opposite electrode is reduced.

Alternatively, in another form of the electro-optical apparatus according to the present invention, the opposite electrode is formed so as to avoid areas opposite the wires for each set of a plurality of adjacent wires in a plane view.

According to this form, the opposite electrode is formed so as to avoid areas opposite the wires disposed on the first substrate for each set of a plurality of wires. For example, the opposite electrode is not formed in a block area in each side of the peripheral area. Therefore, the potential fluctuation of the opposite electrode caused by the potential fluctuations of signals sent through the wires, generated by parasitic capacitors formed between the wires and the opposite electrode is reduced.

Alternatively, in another form of the electro-optical apparatus according to the present invention, the opposite electrode is completely not formed in the peripheral area.

According to this form, in areas opposite wires disposed on the first substrate, the opposite electrode is completely not formed in the peripheral area. Therefore, the potential fluctuation of the opposite electrode caused by the potential fluctuations of signals sent through the wires, generated by parasitic capacitors formed between the wires and the opposite electrode is reduced as much as possible.

In another form of the electro-optical apparatus according to the present invention, the wires include image signal lines formed in the peripheral area, for sending image signals.

According to this form, the opposite electrode is at least partially not formed in areas opposite the image signal lines through which image signals generally having a large potential-fluctuation range and having high frequencies are sent. Therefore, the potential fluctuation of the opposite electrode caused by the potential fluctuations of the image signals sent through the image-signal lines, generated by parasitic capacitors formed between the image-signal lines and the opposite electrode is reduced.

In another form of the electro-optical apparatus according to the present invention, the wires include data lines formed at least in the image-display area, for sending image signals.

According to this form, the opposite electrode is at least partially not formed in areas opposite the data lines through which image signals generally having a large potential-fluctuation range and having high frequencies are sent. Therefore, the potential fluctuation of the opposite electrode caused by the potential fluctuations of the image signals sent through the data lines, generated by parasitic capacitors formed between the data lines and the opposite electrode is reduced.

In this form, an image signal to which serial-parallel conversion has been applied may be sent at the same timing through a plurality of adjacent data lines.

With this structure, the potential fluctuation of the opposite electrode caused by potential fluctuations generated by parasitic capacitors formed between the opposite electrode and the image-signal lines through which image signals to which serial-parallel conversion has been applied are sent is reduced. Therefore, a ghost viewed in a block manner according to the number of serial-parallel conversions is reduced. Consequently, especially even when a driving frequency is increased and low-performance TFTs are used in the sampling circuit to drive a plurality of data lines at the same time, a block-manner ghost is prevented from occurring. Practically, this is very advantageous.

In another form of the electro-optical apparatus according to the present invention, a peripheral circuit is further included in the peripheral area, and the wires include image signal lines formed in the peripheral area, for sending image signals and lead wires for connecting the image signal lines to the peripheral circuit.

According to this form, the opposite electrode is at least partially not formed in areas opposite the image signal lines and the lead wires through which image signals generally having a large potential-fluctuation range and having high frequencies are sent. Therefore, the potential fluctuation of the opposite electrode caused by the potential fluctuations of the image signals, generated by parasitic capacitors formed between the image-signal lines and the lead wires, and the opposite electrode is reduced.

In this form, the peripheral circuit may include a sampling circuit for sampling image signals sent through the lead wires.

With this structure, image signals sent through the lead wires extended from the image signal lines can be sampled by the sampling circuit to send to the pixel electrodes through wires such as the data lines.

In another form of the electro-optical apparatus according to the present invention, an upper-and-lower conducting terminal for electrically connecting the opposite electrode to a part of the wires is provided at a corner of the second substrate.

According to this form, the opposite electrode can be successfully made to have a constant potential (including a constant potential periodically inverted at inverted driving) through the upper-and-lower conducting terminal provided at a corner of the second substrate (opposite substrate) and a part of wires.

In another form of the electro-optical apparatus according to the present invention, the first and second substrates are stuck with a sealing member in a sealing area provided outside the image-display area, and the opposite electrode is at least partially not formed at areas opposite the wires in the sealing area.

According to this form, the opposite electrode is at least partially not formed at areas opposite the wires in the sealing area. Therefore, the potential fluctuation of the opposite electrode caused by the potential fluctuations of signals sent through wires, generated by parasitic capacitors formed between the wires in the sealing area and the opposite electrode is reduced. The "sealing area" described in the present application is an area outside the image-display area and is included in the peripheral area.

In this form, the opposite electrode may be completely not formed in the sealing area.

With this structure, the potential fluctuation of the opposite electrode caused by the potential fluctuations of signals sent through wires, generated by parasitic capacitors formed between the wires in the sealing area and the opposite electrode is reduced as much as possible. In addition, when gap members are mixed with the sealing member in order to control substrate gaps between the first and second substrates in a compact electro-optical apparatus having a diagonal length of about 2 cm, for example, the surface height of the second substrate which the gap members contact is made uniform across the entire sealing area. Therefore, gaps between the substrates can be highly precisely controlled.

In this form, additionally, the second substrate may further be provided with an electrically conductive light-shielding film which specifies a frame around the image-display area and includes an upper-and-lower conducting terminal section for electrically connecting a part of the wires to the opposite electrode.

With this structure, the light-shielding film advantageously performs both of a function for specifying the frame and a function for serving as an upper-and-lower conducting terminal section. In addition, when the upper-and-lower conducting terminal section is extended from a corner of the light-shielding film which specifies the frame, it is very advantageous that a structure for making an upper portion and a lower portion conducting can be obtained in the peripheral area located around the frame without any difficulties. An area where the "frame" described in the present application is formed is an area (an area disposed between the above-described sealing area and the image-display area) along the surrounding of the image-display area in the peripheral area, and is included in the peripheral area.

In another form of the electro-optical apparatus according to the present invention, the second substrate is further provided with an electrically conductive light-shielding film which specifies a frame around the image-display area and is made from a film having aluminum, and the opposite electrode is formed on the light-shielding film which specifies the frame.

According to this form, the electrically conductive light-shielding film made from a film having aluminum advantageously performs both of a function for specifying a frame having a good light-shielding capability and a function for serving as an upper-and-lower conducting terminal section having a good electric conductivity. In addition, since the opposite electrode is formed on the light-shielding film, the light-shielding film is not exposed to etching when the opposite electrode is etched. Therefore, with this structure, it is advantageous that the light-shielding film does not need to be made from a material which is strong against electrical corrosion or which is chemically stable.

To achieve the foregoing object, another electro-optical apparatus according to the present invention may have a structure in which an electro-optic material is sandwiched by a pair of first and second substrates; a plurality of pixel electrodes is provided at an image-display area on the first substrate; wires for sending signals to the pixel electrodes are disposed at the image-display area and a peripheral area located around the image-display area on the first substrate; and an opposite electrode is provided on the second substrate, which is opposite the plurality of pixel electrodes and which is formed at an area not opposite at least wire portions located in the peripheral area of the wires.

According to the another electro-optical apparatus of the present invention, parasitic capacitors generated between the opposite electrode and the wires are reduced by the amount corresponding to the state in which the opposite electrode is not opposite the wires, as compared with cases in which the opposite electrode is formed also at the entire portions opposite the wires in the peripheral area, and further, in which the opposite electrode is formed on the entire surface of the second substrate. As a result, the potential fluctuation of the opposite electrode caused by the potential fluctuations of signals (such as image signals) sent through the wires, generated by the parasitic capacitors formed between the opposite electrode and the wires is reduced.

To achieve the foregoing object, a manufacturing method for an opposite substrate according to the present invention is a manufacturing method for an opposite substrate (including its various forms) according to an above-described electro-optical apparatus of the present invention, including a film forming process of forming an electrically conductive film serving as the opposite electrode on the entire surface of the second substrate; and an etching process of at least partially removing the electrically conductive film formed at areas opposite the wires, by applying photolithography or etching to the electrically conductive film to form the opposite electrode.

According to the manufacturing method for an opposite substrate according to the present invention, first in the film forming process, an electrically conductive film serving as the opposite electrode is formed on the entire surface of the second substrate; and then in the etching process, the electrically conductive film formed at areas opposite the wires is at least partially removed by applying photolithography or etching. Therefore, an opposite electrode according to an above-described electro-optical apparatus (including its various forms) can be manufactured relatively simply.

In one form of an opposite substrate according to the present invention, a plurality of the opposite substrates is formed on a mother board; the electrically conductive film formed at areas along cutting lines is removed in addition to the areas opposite the wires in the etching process, and a cutting process of cutting at the areas along the cutting lines, where the electrically conductive film has been removed is further provided.

According to this form, a plurality of the opposite substrates is formed on the mother board. In the etching process, the electrically conductive film formed at areas along cutting lines is removed. And then, in a cutting process of cutting the plurality of the opposite substrates from the mother board, cutting is performed in the areas along the cutting lines, where the electrically conductive film has been removed. Therefore, in the cutting process, dust and foreign matter which would otherwise be generated by cutting opposite electrodes made from an ITO film or the like is prevented from being generated. To tell it in the reverse way, as compared with a manufacturing method which originally includes an etching process of reducing dust and foreign matter generated from an ITO film and others in such a cutting process, since areas to be etched need to be slightly modified in the present invention, practically it is very advantageous that just a slight manufacturing process is added.

In the cutting process for an opposite substrate according to the present invention, a dicing blade is used for cutting.

According to this form, opposite substrates can be easily cut off along the cutting lines formed on the mother board while the dicing blade is being rotated.

To achieve the foregoing object, a projection-type display apparatus according to the present invention is characterized by including a light source; a light valve formed of an electro-optical apparatus according to the present invention; a light guiding member for guiding light generated by the light source to the light valve; and an optical projection member for projecting light modulated by the light valve.

BRIEF DESCRIPTION OF THE DRAWINGS

FIG. 1 is a plan of a TFT array substrate and each component formed thereon in an electro-optical apparatus according to an embodiment of the present invention, viewed from an opposite-substrate side.

FIG. 2 is a sectional view taken along a line H–H' shown in FIG. 1.

FIG. 3 is a block diagram of peripheral circuits and equivalent circuits of various devices, wires, and others provided for a plurality of pixels formed in a matrix manner, constituting an image-display area in the electro-optical apparatus according to the embodiment of the present invention.

FIG. 4 is a plane pattern view in an area C shown in FIG. 2.

FIG. 5 is a sectional view taken along a line A–A' shown in FIG. 4.

FIG. 6 is a plan showing an example plane pattern of an opposite electrode in the electro-optical apparatus according to the present embodiment.

FIG. 7 is a plan showing another example plane pattern of the opposite electrode in the electro-optical apparatus according to the present embodiment.

FIG. 8 is a plan showing another example plane pattern of the opposite electrode in the electro-optical apparatus according to the present embodiment.

FIG. 9 is a plan showing another example plane pattern of the opposite electrode in the electro-optical apparatus according to the present embodiment.

FIG. 10 is a plan showing an application example of a plane pattern of the opposite electrode in the electro-optical apparatus according to the present embodiment.

FIG. 11 is a plan showing another application example of a plane pattern of the opposite electrode in the electro-optical apparatus according to the present embodiment.

FIG. 12 is a plan of a plurality of groups of adjacent pixels formed on a TFT array substrate on which data lines, scanning lines, pixel electrodes, and others are formed, in an electro-optical apparatus according to an embodiment.

FIG. 13 is a sectional view taken along a line B–B' shown in FIG. 12.

FIG. 14 is a process chart showing manufacturing processes of the opposite substrate according to the present embodiment.

FIG. 15 is a plan of a mother board which includes many opposite substrates according to the present embodiment.

FIG. 16 is a timing chart showing the potential fluctuation of an opposite-electrode potential, caused by the potential fluctuation of an image signal.

FIG. 17 is a plan showing the structure of a projector.

DESCRIPTION OF THE PREFERRED EMBODIMENTS

Embodiments of the present invention will be described below by referring to the drawings. In the following embodiments, an electro-optical apparatus of the present invention is applied to a liquid-crystal apparatus.

The entire structure of an electro-optical apparatus according to an embodiment of the present invention will be described first by referring to FIG. 1 and FIG. 2. A driving-circuit-built-in-type liquid-crystal apparatus using a TFT active matrix driving method is taken as an example of an electro-optical apparatus.

FIG. 1 is a plan of a TFT array substrate and each component formed thereon, viewed from an opposite-substrate side. FIG. 2 is a sectional view taken along H–H' shown in FIG. 1.

In FIG. 1 and FIG. 2, a TFT array substrate 10 and an opposite substrate 20 are disposed oppositely in an electro-optical apparatus according to the present embodiment. A liquid-crystal layer 50 is sealed between the TFT array substrate 10 and the opposite substrate 20. The TFT array substrate 10 and the opposite substrate 20 are stuck each other by a sealing member 52 provided at a sealing area located around an image-display area 10a.

The sealing member 52 is made, for example, from an ultra-violet-ray-setting resin or a thermosetting resin for sticking both substrates, is applied to the TFT array substrate 10 in a manufacturing process, and then, is hardened by the application of an ultra-violet ray or heat. The sealing member 52 is mixed with gap members, such as glass fiber or glass beads, for setting the gap (inter-substrate gap) between both substrates to a predetermined value. The electro-optical apparatus according to the present embodiment is suitable for a small-scale light valve for expanding images, used in a projector. When the electro-optical apparatus is a large-scale liquid-crystal apparatus for displaying images at a size of 100%, such as a liquid-crystal display or a liquid-crystal TV set, the gap members may be included in the liquid-crystal layer 50.

A frame 53 having a light-shielding capability, which specifies the image-display area 10a is provided in parallel to and inside the sealing area where the sealing member 52 is disposed, at the opposite-substrate 20 side. It is, of course, possible that the frame 53 is provided at the TFT array substrate 10 side. Outside the sealing area where the sealing member 52 is disposed among a peripheral area extending around the image-display area, a data-line driving circuit 101 and external-circuit connection terminals 102 are provided along one side of the TFT array substrate 10, and scanning-line driving circuits 104 are provided along two sides adjacent to the one side. A plurality of wires 105 for connecting between the scanning-line driving circuits 104 provided at both sides of the image-display area 10a is provided at the other one side of the TFT array substrate 10. As shown in FIG. 1, an upper-and-lower conducting member 106 is disposed between both substrates at least at one (in FIG. 1, four) of the corners of the opposite substrate 20. The corners of an opposite electrode 21 formed on the opposite substrate 20 function as upper-and-lower conducting terminals at the opposite-substrate 20 side. At areas of the TFT array substrate 10, opposite the corners, upper-and-lower conducting terminals at the TFT array substrate 10 side are provided. With these members and terminals, an electric connection can be made between the TFT array substrate 10 and the opposite substrate 20.

In the present embodiment, a sampling circuit 301 is especially provided at an area on the TFT array substrate 10 below the frame 53. The sampling circuit 301 samples image signals sent through image-signal lines according to sampling-circuit driving signals sent from the data-line driving circuit 101, and sends to the data lines.

The circuit structure and operation of the electro-optical apparatus structured as described above will be described next by referring to FIG. 3. FIG. 3 is a block diagram showing peripheral circuits and equivalent circuits of various devices and wires in a plurality of pixels formed in a matrix manner and constituting the image-display area of the electro-optical apparatus.

In FIG. 3, in each of the plurality of pixels formed in a matrix manner and constituting the image-display area of the electro-optical apparatus according to the present embodiment, a pixel electrode 9a and a pixel TFT 30 for applying switching control to the pixel electrode 9a are formed, and a data line 6a through which an image signal is sent is electrically connected to the source of the pixel TFT 30.

In the peripheral area outside the image-display area 10a, one end (lower end in FIG. 3) of a data line 6a is connected to the drain of a sampling TFT 302 constituting the sampling circuit 301. An image signal line 115 is connected to the source of the sampling TFT 302 through a lead wire 116. A sampling-circuit driving signal line 114 connected to the data-line driving circuit 101 is connected to the gate of the sampling TFT 302. Image signals VID1 to VID 6 sent through image signal lines 115 are sampled by sampling TFTs 302 with the use of sampling-circuit driving signals sent from the data-line driving circuit 101 through sampling-circuit driving signal lines 114, and image signals S1 to Sn are sent to data lines 6a.

In the present embodiment, in order that the same image signal is written at the same timing through six adjacent data lines 6a, a common sampling-circuit driving signal is sent to the gates of the sampling TFTs 302 corresponding to the data lines 6a. A serial-parallel conversion circuit which is an external circuit extends a serial image signal to that six times as long as the original, applies serial-parallel conversion to obtain parallel image signals VID1 to VID6, and sends them. Since serial-parallel conversion is applied to an image signal in every six data lines, not only an image-signal writing time is made six times as long as before but also the driving frequency of the data-line driving circuit can be reduced to one sixth that used before. Therefore, even if sampling TFTs 302 and pixel TFTs 30 have low capabilities, high-speed image processing is allowed. The larger the number of serial-parallel conversions is, the longer the image-signal writing time can be made, but the same number of image signal lines 115 as that of the serial-parallel conversions need to be provided.

Scanning lines 3a are electrically connected to the gates of pixel TFTs 30, and scanning signals G1, G2, . . . , and Gm are applied in that order line-sequentially to the scanning lines 3a at predetermined timing in a pulse manner by a scanning-line driving circuit 104. Pixel electrodes 9a are electrically connected to the drains of the pixel TFTs 30, and the switches of the pixel TFTs 30, which are switching devices, are closed for a constant period to write the image signals S1, S2, . . . , and Sn sent through the data lines 6a, at predetermined timing. The image signals S1, S2, . . . , and Sn having predetermined levels and written into liquid crystal, which serves as an example of an electro-optic material, through the pixel electrodes 9a are maintained for a constant period between the pixel electrodes and the opposite electrode 21 formed on the opposite substrate shown in FIG. 2. Liquid crystal modulates light and allows gradation display because the alignment and order of its molecular groups are changed according to the level of a potential applied. In a normally white mode, transmittance for incident light decreases according to a voltage applied in units of pixels, and in a normally black mode, transmittance for incident light increases according to a voltage applied in units of pixels. As a whole, the electro-optical apparatus emits light having the contrast corresponding to image signals. To prevent maintained image signals from leaking, accumulation capacitors 70 are added in parallel to liquid-crystal capacitors formed between the pixel electrodes 9a and the opposite electrode 21. Along the scanning lines 3a, capacitor lines 3b set to a constant potential and including the capacitor electrodes at a fixed-potential side of the accumulation capacitors 70 are provided. The capacitor lines 3b are connected to a constant potential line outside the image-display area 10a, and a fixed potential VCAP is given. The fixed potential VCAP is sent from the outside of the electro-optical apparatus. Alternatively, it may be sent from a constant-potential line, such as the power sources of the data-line driving circuit 101 and the scanning-line driving circuits 104 formed on the TFT array substrate. It may be connected to an opposite-electrode potential, which is constant, given to the opposite electrode 21 of the opposite substrate 20. With such a structure, since it is not necessary to provide an external-circuit connection terminal 102 shown in FIG. 1 and used for applying the fixed potential VCAP, the electro-optical apparatus can be advantageously made compact.

A detailed structure of the electro-optical apparatus at an area "C" enclosed by a dotted line in FIG. 2 will be described next by referring to FIG. 4. FIG. 4 is a plan of the area "C" and shows specific patterns expressing the equivalent circuit diagram shown in FIG. 3.

In FIG. 4, the sources in a semiconductor layer 304, of the sampling TFTs 302 constituting the sampling circuit 301 are electrically connected to lead wires 116 extended from image signal lines through contact holes 305a. The drains in the semiconductor layer 304, of the sampling TFTs 302 are electrically connected to the data lines 6a through contact holes 305b. The gates of the sampling TFTs 302 are electrically connected to the sampling-circuit driving signal 114 through contact holes 305b. The data lines 6a send the image signals S1 to Sn to the pixel electrodes 9a. To control six adjacent sampling TFTs 302 at the same time, gate lines 303 are provided for the gates of six sampling TFTs 30, as common wiring.

As shown in FIG. 3 and FIG. 4, the sealing area to which the sealing member 52 is applied to stick the TFT array substrate 10 and the opposite substrate 20 is provided between the image signal lines 115 and the sampling circuit 301 in the present embodiment. Wiring areas such as those for the sampling-circuit driving signal lines 114 and the lead wires 116 are effectively used to form the sealing area. When the scanning-line driving circuits 104 are formed on the TFT array substrate 10 outside the opposite substrate 20 as shown in FIG. 1, areas where the scanning lines 3a are laid may be effectively used to form the sealing area.

In the present embodiment, a transparent electrically conductive film, such as ITO, conventionally formed on the whole surface of the opposite substrate 20 is provided such that it at least partially does not overlap with the sampling-circuit driving signal lines 114, which send sampling-circuit driving signals, and the lead wires 116, which send image signals, in the sealing area where the sealing member 52 is applied and its surroundings, that is, such that it does not form an opposite electrode.

More specifically, in FIG. 5, which shows a sectional view taken along a line A–A' shown in FIG. 4, the opposite electrode 21 formed on the opposite substrate 20 is not provided at areas for the lead wires 116, which send image signals. With this structure, since parasitic capacitors are not formed between the lead wires 116 and the opposite electrode, it does not occur that the opposite-electrode potential given to the opposite electrode 21 is fluctuated due to an effect of the potential fluctuation of image signals sent through the lead wires 116. Therefore, as shown in FIG. 16, the opposite-electrode potential LCCOM is always constant as indicated by an arrow "b" without receiving an effect of the potential fluctuation of image signals VIDs in a period (that is, the selection period of the data lines 6a) when the sampling TFTs 302 are ON. Consequently, a ghost does not occur.

Especially when serial-parallel conversion is applied to a serial image signal, since a plurality of data lines 6a are selected at the same time, if the opposite-electrode potential LCCOM fluctuates as indicated by the arrow "a," all of the plurality of selected data lines 6a are affected, a ghost occurs in a block manner, and image quality is conspicuously reduced. In the present embodiment, since the image signals VIDs are not capacitive-coupled with the opposite-electrode potential LCCOM, a ghost does not occur even if the number of serial-parallel conversions increases. Because a higher-definition electro-optical apparatus has higher frequencies in image signals VIDs, unless the capability of the sampling TFTs 302 is improved, the number of serial-parallel conversions needs to be increased. The structure of the present embodiment allows a high-image-quality, high-definition electro-optical apparatus having no ghost to be implemented.

Various examples of the opposite substrate 20 according to the present embodiment will be described next by referring to FIG. 6 to FIG. 11. Each of FIG. 6 to FIG. 10 is a plan showing a plane pattern of the opposite electrode 21 formed on the opposite substrate 20 shown in FIG. 1, together with the frame 53.

In an example shown in FIG. 6, the opposite electrode 21 is formed in a strip-shaped manner when viewed from the top so as to avoid an area 401 opposite wires, such as the image signal lines 115, the lead wires 116 extended from the image signal lines 115, and the sampling-circuit driving signal lines 114 shown in FIG. 3, provided between the data-line driving circuit 101 and the sampling circuit 301, for each wire. With this structure, since the opposite electrode 21 is not formed at least at a part of the areas where the wires and the opposite substrate 20 overlap, the potential fluctuation of the opposite electrode 21 caused by the potential fluctuations of signals sent through the wires, generated by parasitic capacitors formed between the wires and the opposite electrode 21 is reduced.

In an example shown in FIG. 7, the opposite electrode 21 is formed when viewed from the top so as to avoid a block-shaped area 402 opposite a plurality of wires, such as the image signal lines 115, the lead wires 116 extended from the image signal lines 115, and the sampling-circuit driving signal lines 114 shown in FIG. 3, provided between the data-line driving circuit 101 and the sampling circuit 301. With this structure, since the opposite electrode 21 is in a block-shaped manner not formed at least at a part of the areas where the wires and the opposite substrate 20 overlap, the potential fluctuation of the opposite electrode 21 caused by the potential fluctuations of signals sent through the wires, generated by parasitic capacitors formed between the wires and the opposite electrode 21 is largely reduced.

In an example shown in FIG. 8, the opposite electrode 21 is formed when viewed from the top so as to avoid not only an area opposite wires, such as the image signal lines 115, the lead wires 116 extended from the image signal lines 115, and the sampling-circuit driving signal lines 114 shown in FIG. 3, provided between the data-line driving circuit 101 and the sampling circuit 301 but also block-shaped areas 403 near the four sides of the opposite substrate 20. With this structure, even if gap members used for controlling the gap between the TFT array substrate 10 and the opposite substrate 20 are mixed with the sealing member 52 shown in FIG. 1, since the opposite electrode 21 is formed so as to avoid the four sides of the opposite substrate 20 in a uniform manner, highly precise gap control is performed between the TFT array substrate 10 and the opposite substrate 20. With this structure, since the opposite electrode 21 is in a block-shaped manner not formed at least at a part of the areas where the wires and the opposite substrate 20 overlap, the potential fluctuation of the opposite electrode 21 caused by the potential fluctuations of signals sent through the wires, generated by parasitic capacitors formed between the wires and the opposite electrode 21 is largely reduced. In addition, the electro-optical apparatus has high image quality without color unevenness due to stable gap control.

In the examples shown in FIG. 6 to FIG. 8, each of portions of the opposite electrode 21, extended to the four corners of the opposite substrate 20 functions as an upper-and-lower conducting terminal for contacting an upper-and-lower conducting member 106 formed on the TFT array substrate 10 shown n FIG. 1. An upper-and-lower conducting terminal for giving an opposite-electrode potential from the TFT array substrate 10 to the opposite electrode 21 formed on the opposite substrate 20 needs to be formed at one or more corners of the opposite substrate 20. In addition, in the examples shown in FIG. 6 to FIG. 8, the light-shielding film constituting the frame 53 is covered with a transparent electrically conductive film, such as ITO, constituting the opposite electrode 21 on the opposite substrate 20. Therefore, in this case, when the opposite electrode 21 is formed by etching during manufacturing, the light-shielding film constituting the frame 53 is not exposed to etching. Therefore, if the frame 53 is formed of a light-shielding film having Al (aluminum), which is weak against electric corrosion and has a low chemical stability, no problem occurs. Conversely, when the frame 53 is formed of a light-shielding film having Al, a good light-shielding characteristic and a good electric conductivity are obtained at a relatively low cost. In addition, when the electric-optical apparatus is used as a projection-type light valve, since incident light is reflected by Al, which has a high reflectivity, the temperature of the surface of the apparatus is prevented from rising. Therefore, the apparatus advantageously has an extended life against light.

In an example shown in FIG. 9, the opposite electrode 21 is completely not formed in a peripheral area 404 including the sealing area when viewed from the top. In other words, the opposite electrode 21 is formed at an area slightly larger than the image-display area 10a. With this structure, since the opposite electrode 21 does not overlap with wires, such as the image signal lines 115, the lead wires 116 extended from the image signal lines 115, and the sampling-circuit driving signal lines 114 shown in FIG. 3, provided between the data-line driving circuit 101 and the sampling circuit 301, the potential fluctuation of the opposite electrode 21 caused by the potential fluctuations of signals sent through the wires, generated by parasitic capacitors formed between the wires and the opposite electrode 21 does not occur. Therefore, a ghost is not generated. According to the present embodiment, the surface height of the opposite substrate 20 which the gap members mixed with the sealing member 52 shown in FIG. 1 contact is made uniform across the entire sealing area. Therefore, the gap between the substrates can be highly precisely controlled by the gap members. Since the film thickness of the ITO film constituting the opposite electrode 21 is 100 to 200 nm, when the opposite electrode 21 is locally not formed at the sealing area, for example, the control of the gap between the substrates becomes unstable due to the film thickness.

When the opposite electrode 21 is made small as shown in FIG. 9, the opposite electrode 21 cannot serve as an upper-and-lower conducting terminal illustrated in the examples shown in FIG. 6 to FIG. 8, which contacts the upper-and-lower conducting members 106 shown in FIG. 1. Therefore, in this case, as shown in FIG. 9, the frame 53 is made from an electrically conductive light-shielding film, and is extended to the four corners of the opposite substrate 20 and serves as an upper-and-lower conducting terminal 53'. In this case, the electrically conductive light-shielding film constituting the frame 53 is, of course, electrically connected to the opposite electrode 21.

In addition, when the opposite electrode 21 is made small in this way, when the opposite electrode 21 is etched during manufacturing, a light-shielding film constituting the frame 53, which is located under the opposite electrode 21 is also exposed to etching. Therefore, in this case, it is preferred that the frame 53 be formed of a light-shielding film which is strong against electric corrosion or which is chemically stable.

As shown in FIG. 6 to FIG. 9, in the present embodiment, parasitic capacitors generated between the opposite electrode 21 and the wires are reduced by the amount corresponding to the state in which the opposite electrode 21 is not opposite the wires, such as the image signal lines 115, the lead wires 116 extended from the image signal lines 115, and the sampling-circuit driving signal lines 114, in the peripheral area including the sealing area and the frame area, as compared with cases in which the opposite electrode 21 is formed also at the entire portions opposite the wires in the peripheral area, and further, in which the opposite electrode 21 is formed on the entire surface of the opposite substrate 20. As a result, according to the present embodiment, the potential fluctuation of the opposite electrode 21 caused by the potential fluctuations of signals, such as image signals, sent through the wires, generated by parasitic capacitors formed between the wires and the opposite electrode 21 is reduced.

Especially, also when the opposite electrode 21 is made from a relatively-high-resistance ITO film or the like as in the present embodiment, by reducing parasitic capacitors generated between the opposite electrode 21 and the wires in this way, the potential fluctuation of the opposite electrode 21 caused by the parasitic capacitors is efficiently reduced. As a result, the potential of the opposite electrode 21 is successfully made to a constant potential (including a constant potential periodically inverted at inverted driving).

In addition, as in the present embodiment, when the opposite electrode 21 is not formed in the sealing area, since the transmittance in this area increases by the amount corresponding to that state, the sealing member made, for example, from an ultra-violet-ray-setting resin or a thermo-setting resin, is slightly advantageously hardened by using an ultra-violet ray or others.

FIG. 10 and FIG. 11 show an example application of the present embodiment. In the present embodiment, a case in which capacitive coupling not only with wires, such as the image signal lines 115, the lead wires 116 extended from the image signal lines 115, and the sampling-circuit driving signal lines 114, but also with the data lines 6a and the opposite electrode 21 is prevented will be described.

In FIG. 10, the opposite electrode 21 is further not provided in an area 405 which overlaps with the data lines 6a in addition to the example of the opposite substrate 20 shown in FIG. 6. With this structure, since the potential fluctuation of the opposite-electrode potential caused by image signals sent through the data lines 6a does not occur, a ghost is further largely reduced.

FIG. 11 shows a way in which the resistance of the opposite electrode 21 is prevented from increasing in the structure shown in FIG. 10. The opposite electrode 21 overlapping with the data lines 6a is removed at an area 406 to reduce the resistance of the opposite electrode 21 overlapping with the pixel electrodes 9a, as much as possible.

The example application shown in FIG. 10 and FIG. 11 can be combined with the examples of the opposite substrate 20 shown in FIG. 6 to FIG. 9.

The structure of the image-display area in the electro-optical apparatus according to the present embodiment will be described next by referring to FIG. 12 and FIG. 13. FIG. 12 is a plan of a plurality of adjacent pixel groups in the TFT array substrate where data lines, scanning lines, pixel electrodes, and others are formed. FIG. 13 is a sectional view taken along a line B–B' in FIG. 12. In FIG. 12 and FIG. 13, to make the sizes of each layer and each member recognizable in the figure, each layer and each member are shown with different scales.

In FIG. 12 and FIG. 13, the electro-optical apparatus is provided with the TFT array substrate 10 and a transparent opposite substrate 20 disposed opposite the TFT array substrate 10. The TFT array substrate 10 is made, for example, from a quartz substrate, a glass substrate, or a silicon substrate, and the opposite substrate 20 is made, for example, from a glass substrate or a quartz substrate.

In FIG. 12, on the TFT array substrate of the electro-optical apparatus, a plurality of transparent pixel electrodes 9a (their outlines are indicated by dotted-line sections 9a') is provided in a matrix manner, and data lines 6a and scanning lines 3a are provided along the vertical and horizontal boundaries of the pixel electrodes 9a.

The scanning lines 3a are disposed so as to opposite channel areas 1a' indicated by hatching with lines extending to the upper right in FIG. 12, of a semiconductor layer 1a, and the scanning lines 3a serve as gate electrodes. In this way, a pixel TFT 30 in which a scanning line 3a is disposed opposite a channel area 1a' as the gate electrode is provided at each of portions where the scanning lines 3a and the data lines 6a intersect.

As shown in FIG. 12 and FIG. 13, a capacitive line 3b forms an accumulation capacitor 70a through an insulating thin film 2 with a pixel-potential-side capacitive electrode 1f extended from a high-concentration drain area 1e of a pixel TFT 30. Capacitive lines 3b are made from a poly-silicon film in the same layer as for the scanning lines 3a and etched in the same process as the scanning lines 3a. More specifically, the pixel-potential-side capacitive electrode 1f is made from the same film as the channel area 1a' of the pixel TFT 30, and the insulating thin film 2 constituting a first accumulation capacitor 70a is made from the same film as the gate insulating film of the pixel TFT 30. With this structure, even if the film thickness of the insulating thin film 2 is small, the accumulation capacitor is made from a fine dielectric film having a high dielectric strength. The capacitive lines 3b and the pixel-potential-side capacitive electrodes 1f are extended to portions below the data lines 6a to form the first accumulation capacitors 70a also in these portions. In this way, the accumulation capacitors 70 shown in FIG. 3 are increased by effectively using non-aperture portions.

A lower-side light-shielding film 11a is provided below the TFTs 30 on the TFT array substrate 10 in a grid manner. The lower-side light-shielding film 11a is made from a single metal, an alloy, a metal silicide, a poly-silicide, a lamination of these materials, or others including at least one of high-melting-point metals, such as Ti (titanium), Cr (chromium), W (tungsten), Ta (tantalum), Mo (molybdenum), and Pb (lead). The lower-side light-shielding film 11a can be disposed so as to cover the pixel TFTs 30 from the TFT array substrate 10 side through a lower-side insulating film 12 to light-shield from light reflected from the TFT array substrate 10 side. Since this structure light-shields at least the channel areas 1a' of the pixel TFTs 30 and their adjacent areas, a leaking current caused by light is prevented from occurring. When the lower-side light-shielding film 11a is electrically connected to the capacitive lines 3b through contact holes 13 below the data lines 6a, the lower-side light-shielding film 11a serves as a redundant wire of the capacitive lines 3b. With this structure, the capacitive lines are made to have a constant resistance. In addition, accumulation capacitors can be made through the lower-side insulating film 12 between the pixel-potential-side capacitive electrodes 1f and the lower-side light-shielding film 11a.

The pixel electrodes 9a are electrically connected to the high-concentration drain areas 1e of the semiconductor layer 1a via contact holes 8a and 8b through a relay layer 80a. The relay layer 80a is electrically connected to the high-concentration drain areas 1e of the semiconductor layer 1a through the contact holes 8a. When the relay layer 80a is formed so as to lie over the capacitive lines 3b with a dielectric layer 81 being sandwiched, as shown in FIG. 13, second accumulation capacitors 70b is formed. When laminated capacitors are formed above and below the capacitive lines 3b in this way, the accumulation capacitors 70 are increased even in a small area viewed from the top. Therefore, even if an aperture area is extended, sufficient accumulation capacitors 70 are obtained. When the dielectric layer 81 is made thin as long as its dielectric strength permits, the second accumulation capacitors 70b are further increased.

When the relay layer 80a is made from a single metal, an alloy, a metal silicide, a poly-silicide, a lamination of these materials, or others including at least one of high-melting-point metals, such as Ti (titanium), Cr (chromium), W (tungsten), Ta (tantalum), Mo (molybdenum), and Pb (lead), it functions as a light-shielding film.

Upper light-shielding films 80b may be formed in an island manner below the data lines 6a in the same layer as the relay layer 80a. With this structure, since light-shielding films are formed between the data lines 6a and the semiconductor layer 1a, light emitted to the channel areas 1a' and their adjacent areas is effectively prevented.

The pixel electrodes 9a are electrically connected to the relay layer 80a through the contact holes 8b made in a first inter-layer insulating film 4 and a second inter-layer insulating film 7. When the relay layer 80a is intervened in this way, since the thin semiconductor layer 1a is not broken during etching, a reduction in yield caused by a connection error or others does not occur.

As shown in FIG. 13, the data lines 6a are electrically connected to the high-concentration source areas 1d of the semiconductor layer 1a through an insulating thin film 2, the dielectric film 81, and contact holes 5 made in the first inter-layer insulating film 4. The data lines 6a are formed of a low-resistance film having a light-shielding capability, such as Al, and light-shield the channel areas 1a' of the pixel TFTs 30 and their adjacent areas from incident light from the opposite substrate 20 side. With this structure, since at least the channel areas 1a' of the pixel TFTs 30 and their adjacent areas are light-shielded, a leaking current caused by light is prevented from occurring.

A TFT 30 for pixel switching has a LDD (Lightly Doped Drain) structure, and includes a scanning line 3a; a channel area 1a' in the semiconductor layer 1a, in which a channel is formed by an electric field made by the scanning line 3a; an insulating thin film 2 which includes a gate insulating film for insulating the scanning line 3a and the semiconductor layer 1a; a low-concentration source area 1b and a low-concentration drain area 1c in the semiconductor layer 1a; and a high-concentration source area 1d and a high-concentration drain area 1e in the semiconductor layer 1a.

Furthermore, at the upper side of the pixel electrodes 9a, an alignment film 16 to which predetermined alignment processing such as rubbing processing has been applied is provided. The pixel electrodes 9a are made, for example, from a transparent electrically conductive film, such as ITO. The alignment film 16 is made, for example, from a organic film, such as a polyimide film.

In contrast, the opposite substrate 20 is provided with an opposite electrode 21 on its entire surface, and an alignment film 22 to which predetermined alignment processing such as rubbing processing has been applied is provided at the lower side thereof. The opposite electrode 21 is made, for example, from a transparent electrically conductive film, such as ITO. The alignment film 22 is made, for example, from an organic film, such as a polyimide film.

The opposite substrate 20 may be provided with a grid-shaped or stripe-shaped light-shielding film 23. With this structure, incident light coming from the opposite substrate 20 side is positively prevented from entering the channel areas 1a', the low-concentration source areas 1b, and the low-concentration drain areas 1c. In addition, when such a light-shielding film made on the opposite substrate 20 is made from a highly-reflective material such as Al at least at a surface illuminated by incident light, the temperature of the electro-optical apparatus is prevented from rising. The light-shielding film 23 may be made in the same process from the same film as the frame 53 shown in the figure.

Between the TFT array substrate 10 and the opposite substrate 20 structured as described above and disposed such that the pixel electrodes 9a and the opposite electrode 21 face, liquid crystal, an example of an electro-optic material, is sealed in a space enclosed by the sealing member 52 (shown in FIG. 1 and FIG. 2) to form a liquid-crystal layer 50.

In the present embodiment, a surface of the second inter-layer insulating film 7 is made flat by CMP (Chemical Mechanical Polishing) processing or others, which reduces an alignment error of the liquid crystal in the liquid-crystal layer 50, caused by height unevenness generated by various wires and devices disposed therebelow.

In the embodiment described so far, making a surface of a third inter-layer insulating film 7 flat releases height unevenness generated at portions along the data lines 6a and the scanning lines 3a on the base plane of the pixel electrodes 9a due to a plurality of laminated electrically conductive layers as shown in FIG. 13. Instead of this method or in addition to this method, ditches may be made in the TFT array substrate 10, a base insulating film 12, the first inter-layer insulating film 4, and the second inter-layer insulating film 7 to put wires such as the data lines 6a and the pixel TFTs 30 in it for flattening.

It is needless to say that TFTs shown in FIG. 3 constituting the data-line driving circuit 101, the sampling circuit 301, and the scanning-line driving circuits 104 can be formed in the same process as for the pixel TFTs 30.

Manufacturing processes of the opposite substrate 20 having the opposite electrode 21 and others will be described next by referring to FIG. 14 and FIG. 15. FIG. 14 is a process chart sequentially showing the section of the portion corresponding to FIG. 5 in each manufacturing process of the opposite substrate. FIG. 15 is a plan showing many opposite substrates formed on a mother board.

In a process (1) of FIG. 14, a light-shielding film such as Al or Cr is made on the entire surface of the opposite substrate 20 by sputtering or CVD (chemical vapor deposition), and then the frame 53 having the plane pattern shown in FIG. 1 is formed by photolithography or etching.

Next, in a process (2) of FIG. 14, an ITO film 21' is formed on the entire surface of the opposite substrate 20, including the frame 53, by CVD. In general, the ITO film 21' formed in this way is used as is as the opposite electrode 21.

Next, in a process (3) of FIG. 14, a photoresist 600 is formed at areas except areas (such as the area 401 shown in FIG. 6) overlapping with wire sections, by photolithography or etching.

Next, in a process (4) of FIG. 14, the ITO film 21' is etched through the photoresist 600 by dry etching, wet etching, or a combination of both to form the opposite electrode 21. Then, the photoresist 600 is removed. Especially when the examples shown in FIG. 6 to FIG. 8 are manufactured, since the frame 53 is not exposed to etching in the process, the frame can be made from a film which includes Al, which is weak against electric corrosion, as described before. When the example shown in FIG. 8 is manufactured, since the frame 53 is exposed to etching in this process, it is preferred that a light-shielding film which is strong against electric corrosion be employed.

Finally, in a process (5) of FIG. 14, an organic film such as a polyimide film is formed on the entire surface of the opposite substrate 20, including the opposite electrode 21, and rubbing is applied to the film in a predetermined direction to form an alignment film 22.

As described above, according to the manufacturing processes of the present invention, the opposite substrate according to the electro-optical apparatus of the present embodiment descried above is manufactured relatively simple. Especially, as compared with usual manufacturing processes for forming an opposite electrode on the entire surface of a substrate, only processes for patterning the ITO film 21', indicated in the process (3) and the process (4) of FIG. 14 need to be added.

As shown in FIG. 15, it is preferred in the present embodiment that each process shown in FIG. 14 be applied to each area enclosed by cutting lines 501 on a mother board 500 to form many opposite substrates 20 at the same time. Then, after the process (5) of FIG. 14, the mother board can be easily cut by rotating a dicing blade along the cutting lines 501. Then, an individual opposite substrate 20 is made. It is more preferred that portions of the ITO film 21' formed at areas along the cutting lines 501 be also removed when the ITO film 21' is patterned in the process (3) and the process (4). More specifically, an ITO film 21' formed at an area between the cutting lines 501 and dotted lines 502 is removed to prevent ITO-film dust and foreign matter from being generated when opposite substrates are cut off. In other words, since the processes for patterning the opposite electrode 21 and a process for preventing ITO-film dust and foreign matter from being generated when opposite substrates 20 are cut off from the mother board 500 can be combined, advantageous manufacturing processes are used. To cut off opposite substrates 20 from the mother board 500, a scribe method may be used.

In the embodiment described by referring to FIG. 1 to FIG. 12, instead of providing the data-line driving circuit 101 and the scanning-line driving circuits 104 on the TFT array substrate 10, they may be electrically and mechanically connected, for example, to a driving LSI mounted on a TAB (Tape Automated bonding) substrate through an anisotropic electrically conductive film provided for a peripheral section of the TFT array substrate. At each of a side on which projection light is incident of the opposite substrate 20 and a side from which emitted light is emitted of the TFT array substrate 10, a polarizing film, a retardation film, a polarizing plate, and others are disposed in a predetermined direction according to an operation mode, such as a TN mode, a VA (Vertically Aligned) mode, or a PDLC (Polymer Dispersed Liquid Crystal) mode, and according to whether a normally white mode or a normally black mode is used.

EXAMPLE APPLICATION OF ELECTRO-OPTICAL APPARATUS

The electro-optical apparatus described above in each embodiment can be applied to a projector. A projector using an above-described electro-optical apparatus as a light valve will be described. FIG. 17 is a plan showing the structure of the projector. As shown in the figure, inside the projector 1100, a lamp unit 1102 formed of a white light source such as a tungsten-halogen lamp is provided. Projection light emitted from the lamp unit 1102 is separated into three primary colors RGB by three mirrors 1106 and two dichroic mirrors 1108 disposed inside, and lead to light valves 100R, 100G and 100B each corresponding to each primary color. The structure of the light valves 100R, 100G, and 100B is the same as that of the electro-optical apparatus according to an above-described embodiment, and they are driven by R, G, and B primary-color signals sent from a processing circuit (not shown in the figure) to which an image signal is input. Since B light has a longer optical path than R light and G light, B light is lead through a relay-lens system 1121 formed of an incident lens 1122, a relay lens 1123, and an outgoing lens 1124 to prevent a loss.

Light modulated by the light valves 100R, 100G, and 100B is incident on a dichroic prism 1112 in three directions. In the dichroic prism 1112, the R light and the B light are refracted by 90 degrees, and the G light goes straight. Therefore, an image of each color is combined and then, a color image is projected by a projection lens 1114 on a screen 1120.

Since light corresponding to R, G, and B primary colors is incident on the light valves 100R, 100G, and 100B by the dichroic mirror 1108, there is no need to provide a color filter, as described above. Images passing through the light valves 100R and 100B are reflected by the dichroic mirror 1112 and then projected whereas an image passing through the light valve 100G is projected as is. Therefore, images displayed by the light valves 100R and 100B are inverted right and left against an image displayed by the light valve 100G.

In each embodiment, the opposite substrate 20 is not provided with a color filter. However, an RGB color filter may be formed at a predetermined area opposite the pixel electrodes 9a together with a protection film on the opposite substrate 20. With this structure, the electro-optical apparatus according to each embodiment can be applied to direct-view-type and reflection-type color electro-optical apparatuses other than projectors. A micro-lens may be formed on the opposite substrate 20 with one to one-pixel correspondence. Alternatively, a color filter layer can be formed below the pixel electrodes 9a opposite RGB on the TFT array substrate 10 by color resist or others. With this structure, the light collecting efficiency of incident light is improved to implement a bright electro-optical apparatus. In addition, many interference layers having different refractive indexes may be deposited on the opposite substrate 20 to form a dichroic filter which uses interference of light to make R, G, and B colors. With the opposite substrate having the dichroic filter, a brighter color electro-optical apparatus is implemented.

The present invention is not limited to the above-described embodiments, and can be appropriately modified within the scope or principle of the invention understood from claims and the entire specification. Electro-optical apparatuses and manufacturing methods therefor having such a modification are also included in the technical area of the present invention.

What is claimed is:

1. An electro-optical apparatus, comprising:
    a first substrate having an image-display area and a peripheral area disposed around the image-display area;
    a second substrate;
    an electro-optic material sandwiched between the first and second substrates;
    a plurality of pixel electrodes provided at the image-display area of the first substrate;
    a plurality of data lines providing with image signal to the pixel electrodes;
    external circuit connection terminals formed at the peripheral area;
    a plurality of image signal lines provided with the image signal from the external-circuit connection terminals, and formed at the peripheral area;
    a data line driving circuit formed at the peripheral area;
    a sampling-circuit driving signal line provided with a sampling-circuit driving signal from the data line driving circuit, and formed at the peripheral area;
    a sampling circuit providing the image signal from the image signal lines to the corresponding data lines based on the sampling-circuit driving signal; and
    an opposite electrode provided at the second substrate, being formed by a transparent conductive film, the opposite electrode being disposed opposite the plurality of pixel electrodes, the opposite electrode being formed so as not to extend into at least at a part of an area of the second substrate, the area being opposite at least the image signal lines portions located in the peripheral area.

2. The electro-optical apparatus according to claim 1, the opposite electrode being formed in at least one of a strip manner and in a stripe manner so as to avoid areas opposite the image signal lines for each image signal lines as viewed in a plan view.

3. The electro-optical apparatus according to claim 1, the opposite electrode being formed so as to avoid areas opposite the image signal lines for each set of a plurality of adjacent image signal line as viewed in a plan view.

4. The electro-optical apparatus according to claim 1, further comprising wires including image signal lines formed in the peripheral area, the image signal lines sending image signals.

5. The electro-optical apparatus according to claim 1, an image signal to which serial-parallel conversion has been applied being sent at the same timing through a plurality of adjacent data lines.

6. The electro-optical apparatus according to claim 1, further including an upper-and-lower conducting terminal that electrically connects the opposite electrode to a part of wires, the terminal being provided at a corner of the second substrate.

7. The electro-optical apparatus according to claim 1, the first and second substrates being bonded with a sealing member in a sealing area provided outside of the image-display area, and
the opposite electrode formed so that at least a part of the opposite electrode does not extend into areas opposite the image signal lines in the sealing area.

8. The electro-optical apparatus according to claim 7, the second substrate being further provided with an electrically conductive light-shielding film which specifies a frame around the image-display area and includes an upper-and-lower conducting terminal section that electrically connects a part of the wires to the opposite electrode.

9. The electro-optical apparatus according to claim 1, the second substrate being further provided with an electrically conductive light-shielding film which specifies a frame around the image-display area and which is made from a film having aluminum, and
the opposite electrode being formed on the light-shielding film which specifies the frame.

10. The electro-optical apparatus according to claim 1, the opposite electrode being formed so as not to extend into at least at a part of an area opposite at least the image signal lines and the sampling-circuit driving signal line portions located in the peripheral area.

11. The electro-optical apparatus according to claim 1, the opposite electrode having a characteristic in which the transparent conducting film does not extend into the area of the second substrate that is opposite the image signal lines portions located in the peripheral area.

12. The electro-optical apparatus according to claim 11, the opposite electrode further having a characteristic in which formation of parasitic capacitors between the opposite electrode and the image signal lines portions is avoided.

13. The electro-optical apparatus according to claim 1, the opposite electrode being formed so as not to extend into an area of the second substrate, the area being opposite the sampling-circuit driving signal line.

14. The electro-optical apparatus according to claim 1, the second substrate being further provided with an electrically conductive light-shielding film which specifies a frame around the image-display area, the area of the second substrate positioned outside of the frame.

15. A projection-type display apparatus, comprising:

a light source;

a light valve formed of the electro-optical apparatus of claim 1;

a light guiding member that guides light generated by the light source to the light valve; and an optical projection member that projects light modulated by the light valve.

16. An electro-optical apparatus, comprising:

a first substrate having an image display area and a peripheral area disposed around the image-display area;

a second substrate;

an electro-optic material sandwiched between first and second substrates;

a plurality of pixel electrodes provided at the image-display area of the first substrate;

a plurality of data lines providing with image signal to the pixel electrodes;

external-circuit connection terminals formed at the peripheral area;

a plurality of image signal lines provided with the image signal from the external-circuit connection terminals, and formed at the peripheral area;

a data line driving circuit formed at the peripheral area;

a sampling-circuit driving signal line provided with a sampling-circuit driving signal from the data line driving circuit, and formed at the peripheral area;

a sampling circuit providing the image signal from the image signal lines to the corresponding data lines based on the sampling-circuit driving signal; and an opposite electrode provided at the second substrate, being formed by a transparent conductive film, the opposite electrode being disposed opposite the plurality of pixel electrodes, the opposite electrode being formed at an area of the second substrate that is not opposite at least the image signal lines portions located in the peripheral area.

17. An electro-optical apparatus, comprising:

a first substrate having an image-display area and a peripheral area disposed around the image-display area;

a second substrate;

an electro-optic material sandwiched between the first and second substrates;

a plurality of pixel electrodes provided at the image-display area of the first substrate;

a plurality of data lines providing with image signal to the pixel electrodes;

external circuit connection terminals formed at the peripheral area;

a plurality of image signal lines provided with the image signal from the external-circuit connection terminals, and formed at the peripheral area;

a data line driving circuit formed at the peripheral area;

a sampling-circuit driving signal line provided with a sampling-circuit driving signal from the data line driving circuit, and formed at the peripheral area;

a sampling circuit providing the image signal from the image signal lines to the corresponding data lines based on the sampling-circuit driving signal; and an opposite electrode provided at the second substrate, the opposite electrode being formed by a transparent conductive film, the opposite electrode being disposed opposite the plurality of pixel electrodes, the transparent conductive film being formed so as not to extend into at least at a part of an area of the second substrate, the area being opposite at least the image signal lines portions located in the peripheral area.

* * * * *